(12) United States Patent
Aderton et al.

(10) Patent No.: US 7,370,092 B2
(45) Date of Patent: May 6, 2008

(54) SYSTEM AND METHOD FOR ENHANCED SOFTWARE UPDATING AND REVISION

(75) Inventors: Harry Aderton, Eatontown, NJ (US);
Richard Aderton, Little Silver, NJ (US); Prakash Patel, Iselin, NJ (US);
John Reckeweg, South Toms River, NJ (US); Gary Rietmann, Manahawkin, NJ (US)

(73) Assignee: Computer Sciences Corporation, El Segundo, CA (US)

( * ) Notice: Subject to any disclaimer, the term of this patent is extended or adjusted under 35 U.S.C. 154(b) by 899 days.

(21) Appl. No.: 10/242,309

(22) Filed: Sep. 12, 2002

(65) Prior Publication Data

US 2004/0054764 A1 Mar. 18, 2004

(51) Int. Cl.
*G06F 15/177* (2006.01)
(52) U.S. Cl. ............... 709/220; 709/203; 709/223; 709/224; 370/254; 717/101; 717/120; 717/168
(58) Field of Classification Search ............... 709/219, 709/223, 227, 238, 203, 220, 224; 717/101, 717/120, 121, 168, 170–174, 176–178; 370/254
See application file for complete search history.

(56) References Cited

U.S. PATENT DOCUMENTS

| | | | |
|---|---|---|---|
| 5,263,164 A | 11/1993 | Kannady et al. | |
| 5,581,764 A | 12/1996 | Fitzgerald et al. | |
| 6,167,567 A * | 12/2000 | Chiles et al. | 717/173 |
| 6,199,204 B1 | 3/2001 | Donohue | |
| 6,202,207 B1 * | 3/2001 | Donohue | 717/173 |
| 6,272,536 B1 | 8/2001 | Van Hoff et al. | |
| 6,282,712 B1 * | 8/2001 | Davis et al. | 717/170 |
| 6,324,691 B1 | 11/2001 | Gazdik | |
| 6,848,101 B2 * | 1/2005 | Maekawa et al. | 717/178 |
| 6,877,037 B1 * | 4/2005 | Adachi | 709/227 |
| 6,963,911 B2 * | 11/2005 | Gebhardt Jr. et al. | 709/223 |
| 6,966,060 B1 * | 11/2005 | Young et al. | 717/177 |
| 2001/0034847 A1 | 10/2001 | Gaul, Jr. | |

OTHER PUBLICATIONS

Bind View "NETinventory®" May 2002, 2 pages.
Microsoft Corp. "HFNetChk" 2002, Online promotional material, 6 pages.
St. Bernard Software "Scan and Remediate" 2001, Online promotional material, 3 pages.
Marimba "Application Distribution with the Infrastructure Module", 2002, Online promotional material, 2 pages.

(Continued)

*Primary Examiner*—Thu Ha Nguyen
(74) *Attorney, Agent, or Firm*—Meyertons, Hood, Kivlin, Kowert & Goetzel, P.C.; Eric B. Meyertons

(57) ABSTRACT

An update system configured to provide software updates, software patches and/or other data packets to one or more computer systems via a network is disclosed. The update system may interact with a network management system, such as an enterprise management system, to distribute data packets and gather configuration information. The update system may generate and send commands to the network management system. The network management system may carry out the commands to distribute data packets and/or gather configuration information.

24 Claims, 33 Drawing Sheets

OTHER PUBLICATIONS

Marimba "Targeted Distribution with the Subscription Module", 2002, Online promotional material, 2 pages.
Marimba "Marimba Desktop/Mobile Product Family", 2002, Online promotional material, 2 pages.
Marimba "Deployment Status and Compliance reporting with the Inventory Module", 2002, Online promotional material, 1 page.
Marimba "The Marimba® Advantage: Stateless Application Management", 2002, Online promotional material, 8 pages.
Novadigm "When Software is Your Business" 2002, Online promotional material, 3 pages.
Novadigm "Patent Brief", Dec. 23, 1994, 6 pages.

* cited by examiner

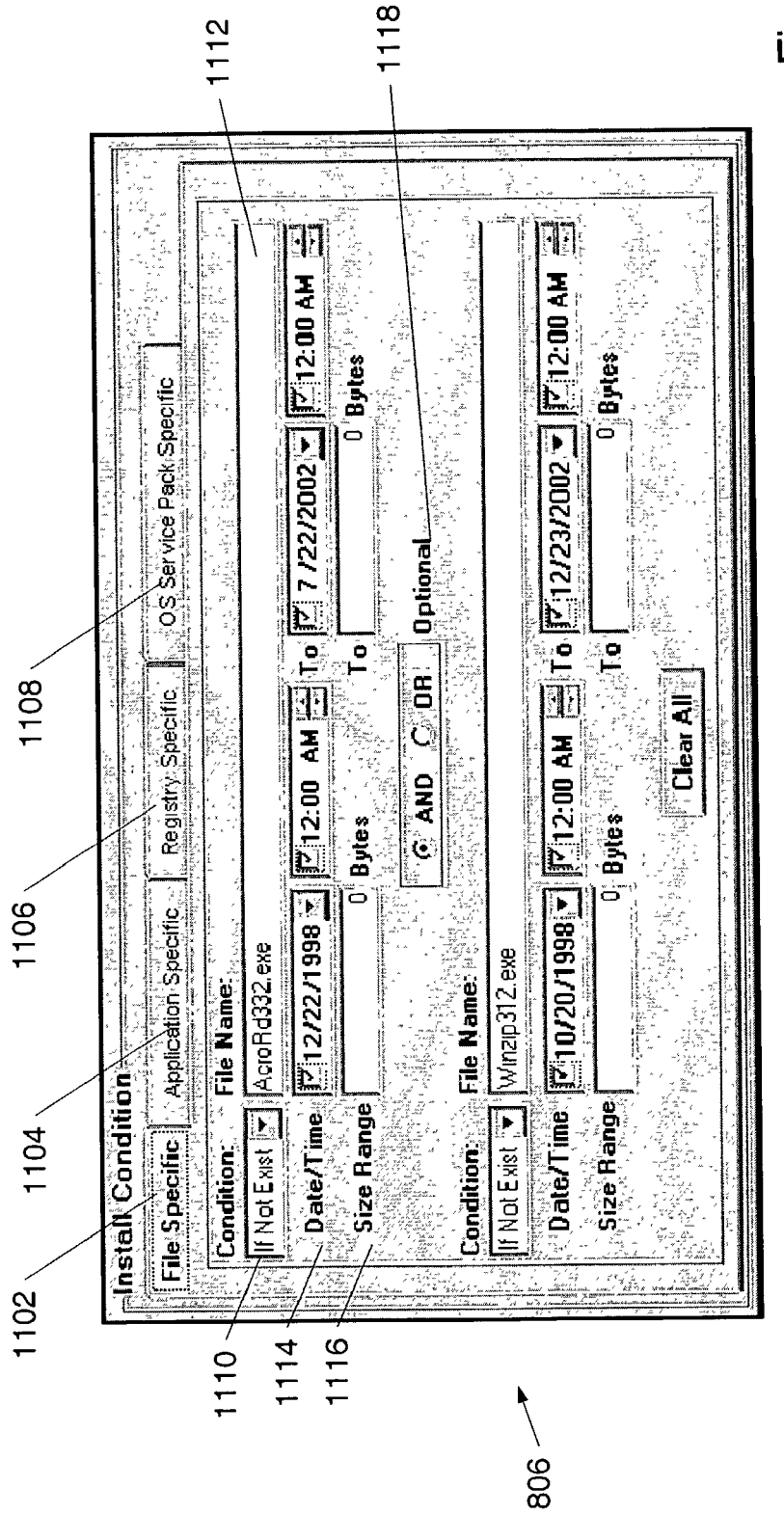

Computer Sciences Corporation
EASI-TCNO

Software Summary (Identified)

Total Software:

| Software Name | Software Version | Quantity* |
|---|---|---|
| 16-bit InstallShield Deluxe | 5.50 | 7 |
| 16-bit InstallShield Deluxe | 5.51 | 4 |
| Adobe Acrobat Reader | 4.0 | 2 |
| Adobe Acrobat Reader | 50.50 | 6 |
| Adobe Acrobat Reader (32-bit) | 30.1 | 2 |
| AOL Instant Messenger | [2] | 1 |
| Borland VisiBroker for Java | 3.2 | 3 |
| BV DMI Tool | 6.6 | 4 |
| BV DMI Tool | 6.1 | 3 |
| Cheyenne AntiVirus for Windows 95 | 4 x [2] | 1 |
| Cheyenne ARCserve | 6.5 | 1 |
| Home | 1.2.33 | 2 |
| HyperTerminal Applet | 4.0 | 1 |
| HyperTerminal Applet | 5 | 42 |
| HyperTerminal Applet | 5.0 | 8 |
| IBM Java Runtime Environment for Windows | 11.8 | 3 |
| ICQ | 2002A | 1 |
| ICQ Setup | 2002A | 2 |
| Imaging for Windows NT | 4.0 [1] | 1 |
| IntraLAN for Windows NT | 4.0 | 8 |
| InstallShield | 5.51 | 5 |
| Internet Account Manager | 5.5 SP-1 | 1 |
| jog home | 1.11 | 2 |
| Load WebCheck | [4] | 1 |
| Load WebCheck | [5] | 1 |
| Lotus Notes | 5.0x [2] | 2 |
| Microsoft Access | 2000 | 5 |

* Number of Nodes the Software is found on.

Fig. 21L ic system. The update system may be configured to

SYSTEM AND METHOD FOR ENHANCED SOFTWARE UPDATING AND REVISION

BACKGROUND OF THE INVENTION

1. Field of the Invention

Embodiments disclosed herein generally relate to the field of control of computer networks. More particularly, the present invention relates to a system and method for controlling distribution of data packets to one or more computer systems coupled to a network of computers.

2. Description of the Related Art

It has become quite common for organizations to have computer networks spanning large areas and/or including a large number of computer systems. For example, many government, commercial and educational organizations have networks that include hundreds of computers distributed over very large areas. Some of these networks are literally global. The number and distribution of computer systems on such networks makes managing them a difficult and resource intensive task. On top of this difficulty is the increased need for security in many networks. Both the increase in hostile code (e.g., viruses, worms, etc.) and the prevalence of attacks on networks by individuals (e.g., hackers) cause network security to be a high priority in many organizations.

In addition to security concerns, organizations managing a network may desire to have some control over software applications that are installed on computers coupled to the network. Such control may be desirable to ensure software compatibility, licensing control, etc.

Several categories of software tools have been created to help administrators (including network administrators and system or desktop systems administrators) deal with the challenge of configuration management over networks. Some such tools are commonly referred to as enterprise management systems (EMS) or network management systems. An EMS may allow an administrator to control a computer system remotely. Thus, the EMS may allow the administrator to determine the configuration of the computer system. The EMS may also allow the administrator to alter the configuration. For example, the administrator may be able to remotely install software onto a computer system. An EMS may also assist an administrator in overseeing network access functions.

Another category of software tools is the patch management system. Patch management systems are designed to assist an administrator in distributing one or more software updates, or patches, to a number of computer systems substantially simultaneously. The software update process is often done in the background so that a user of the computer system is not affected by the update. Patch management systems may be divided into two categories, agent based and non-agent based. An agent based patch management system requires that an agent application, associated with the patch management system, be installed on each computer system that the patch management system will be updating. In a large network, installing an agent on each computer may be very time consuming and resource intensive. Non-agent based systems do not require an agent; rather, they gather information regarding the computers coupled to the network remotely. This may be problematic at times if the network is not relatively static. Changes in the network may cause the non-agent based patch management system to be unable to access one or more computers on the network.

SUMMARY OF THE INVENTION

In an embodiment, a method of providing data packets to a plurality of computer systems coupled to a network may include providing a network management system on the network. The network management system may include one or more agent programs on one or more computer systems coupled to the network. An agent program may be configured to receive commands from a network management system server and to implement received commands on the computer system. An update system may also be provided on the network. The update system may be configured to issue commands to the network management system for execution on the network management system server or on one or more computer systems coupled to the network. The update system may be configured by a user to identify one or more data packets and to associate one or more data packets with one or more computer systems. One or more commands may be generated in the update system and sent from the update system to the network management system. In response to one or more commands, the network management system may install one or more data packets on one or more computer systems coupled to the network. The network management system may utilize functions available to the network management system server and/or one or more network management system agents to install the data packet(s). In an embodiment, a log file may be stored on a computer system which lists commands received by the computer system from the update system via the network management system.

In some embodiments, the update system may also be configured to generate one or more commands, which cause the network management system to determine configuration information regarding one or more computer systems coupled to the network. Configuration information may include hardware and/or software configuration information. For example, the update system may also invoke functions of the network management system to determine whether one or more data packets were installed properly by the network management system.

In an embodiment, configuration information may be determined by scanning one or more computer systems coupled to the network using a scanning agent. Configuration information may be compared to a software list. Comparison of configuration information to the software list may be used to determine whether a data packet should be sent to a particular computer system or group of computer systems. The comparison may also be used to determine whether prohibited software applications are present on a computer system. The configuration information may be stored in a memory for use in making decisions and generating status reports. In certain embodiments, no additional software (e.g., agent applications) need to be installed on a computer system coupled to the network in order to execute the update system. In some embodiments, the update system may send its own scanning agent via the network management system to one or more computer systems coupled to the network. For example, the update system scanning agent may be used to provide a secondary verification of whether a data packet was installed properly by the network management system. In some of such embodiments, the update system scanning agent may not persist on computer systems to which it was sent after providing scanning information to the update system. For example, the update system scanning agent may be deleted from the computer systems.

An update system, in one embodiment, may allow a user to assign one or more computer systems coupled to the network to one or more groups. In such embodiments, data packets to be distributed may be associated with one or more computer systems and/or one or more groups.

An update system may be configured to send a data packet to a computer system based on one or more configured rules (or criteria). For example, a criterion may depend on whether one or more files having specified parameters exist on the computer system. In another example, a criterion may depend on whether one or more software applications having specified parameters exist on the computer systems. In another example, a criterion may depend on whether the registry file of the computer system meets specified parameters. Other examples may include whether an operating system of the computer systems meets specified parameters, whether a specified time has elapsed, whether an allowed number of attempts to send the data packet has been met, etc.

In an embodiment, one or more data packets may be provided in a memory associated with a network management system server. An update system may also be provided. The update system may be configured to provide one or more data packets to one or more computer systems on the network. The update system may attempt to place one or more data packets on one or more of the computer systems. After attempting to place one or more data packets on one or more computers, the update system may determine whether one or more of the placement attempts were successful (e.g., by scanning one or more computer systems). If one or more placement attempts were unsuccessful, the update system may determine if an allowed number of unsuccessful placement attempts for at least one computer system has been met. If the allowed number of unsuccessful placement attempts for at least one computer system has been met, the computer system may be inhibited from logging on to the network. If the computer system is in use, the computer system may be forcibly logged off the network.

In another embodiment, an update system may determine if one or more data packets are present on one or more computer systems (e.g., by scanning one or more computer systems). The update system may select one or more computer systems to which one or more additional data packets should be sent. For example, one or more computer systems may be sent additional data packets based on the configuration of the receiving computer system, a group to which the receiving computer system is assigned in the update system, etc. One or more additional data packets may be sent to one or more selected computers systems. A determination may be made as to whether one or more additional data packets were received and loaded onto one or more computer systems.

BRIEF DESCRIPTION OF THE DRAWINGS

Other objects and advantages of the invention will become apparent upon reading the following detailed description and upon reference to the accompanying drawings in which:

FIG. 11A depicts an embodiment of a condition section of a configuration window with the file tab selected;

FIG. 21B depicts an example of an overview report of status and activities for an entire network;

FIG. 21E depicts an example of a report of status and activities related to data packets assigned to a group;

FIG. 21I depicts an example of a detailed report of status and activities related to one or more nodes;

FIG. 21J depicts an example of a report summarizing software applications identified on a network;

FIG. 21K depicts an example of a report listing installation history of the update system by node; and FIG. 21L depicts an example of a report summarizing status and activities related to a number of groups.

Figure 1:
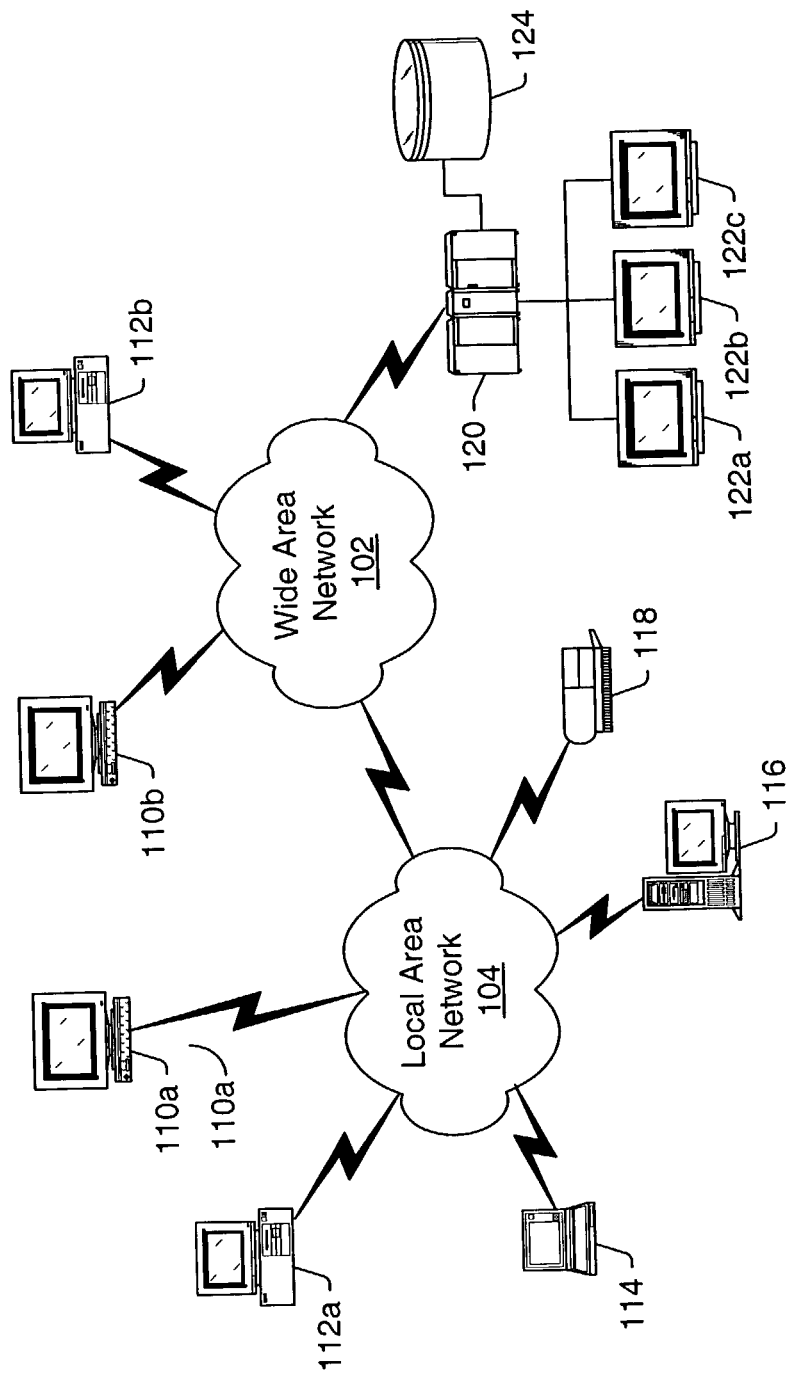
FIG. 1 depicts embodiments of a wide area network and a local area network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Embodiments described herein provide methods, systems, and carrier media for distributing data packets to one or more computer systems coupled to a network of computers.

FIG. 1 illustrates a wide area network (WAN) according to one embodiment. WAN 102 is a network that spans a relatively large geographical area. The Internet is an example of WAN 102. WAN 102 typically includes a plurality of computer systems which are interconnected through one or more networks. Although one particular configuration is shown in FIG. 1, WAN 102 may include a variety of heterogeneous computer systems and networks which are interconnected in a variety of ways and which may run a variety of software applications.

One or more local area networks (LANs) 104 may be coupled to WAN 102. A LAN 104 is a network that spans a relatively small area. Typically, a LAN 104 is confined to a single building or a group of buildings. Each node (i.e., individual computer system or device) on a LAN 104 preferably has its own CPU with which it executes programs, and each node is able to access data and devices anywhere on the LAN 104. The LAN 104 thus allows many users to share devices (e.g., printers) as well as data stored on file servers. The LAN 104 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves, etc.).

Each LAN 104 includes a plurality of interconnected computer systems and optionally one or more other devices: for example, one or more workstations 110a, one or more personal computers 112a, one or more portable computer devices (e.g., laptop or notebook computer systems 114), one or more server computer systems 116, and one or more network printers 118. As used herein, a "server" refers to a computer program that, during execution, provides services to other computer programs executing in the same or other computer systems. The computer system on which a server program is executing may also be referred to as a server, though it may contain a number of server and client programs. In the client/server model, a server is a program that awaits and fulfills requests from client programs in the same or other computer systems. The LAN 104 may be coupled to other computer systems and/or other devices and/or other LANs through WAN 102.

One or more mainframe computer systems 120 may be coupled to WAN 102. As shown, mainframe 120 may be coupled to a storage device or file server 124 and mainframe terminals 122a, 122b, and 122c. Mainframe terminals 122a, 122b, and 122c may access data stored in the storage device or file server 124 coupled to or included in mainframe computer system 120.

WAN 102 may also include computer systems which are connected to WAN 102 individually and not through a LAN 104: as illustrated, for purposes of example, a workstation 110b and a personal computer 112b. For example, WAN 102 may include computer systems which are geographically remote and connected to each other through the Internet. As used herein, the term "network" includes a LAN 104 or a WAN 102.

Figure 2:
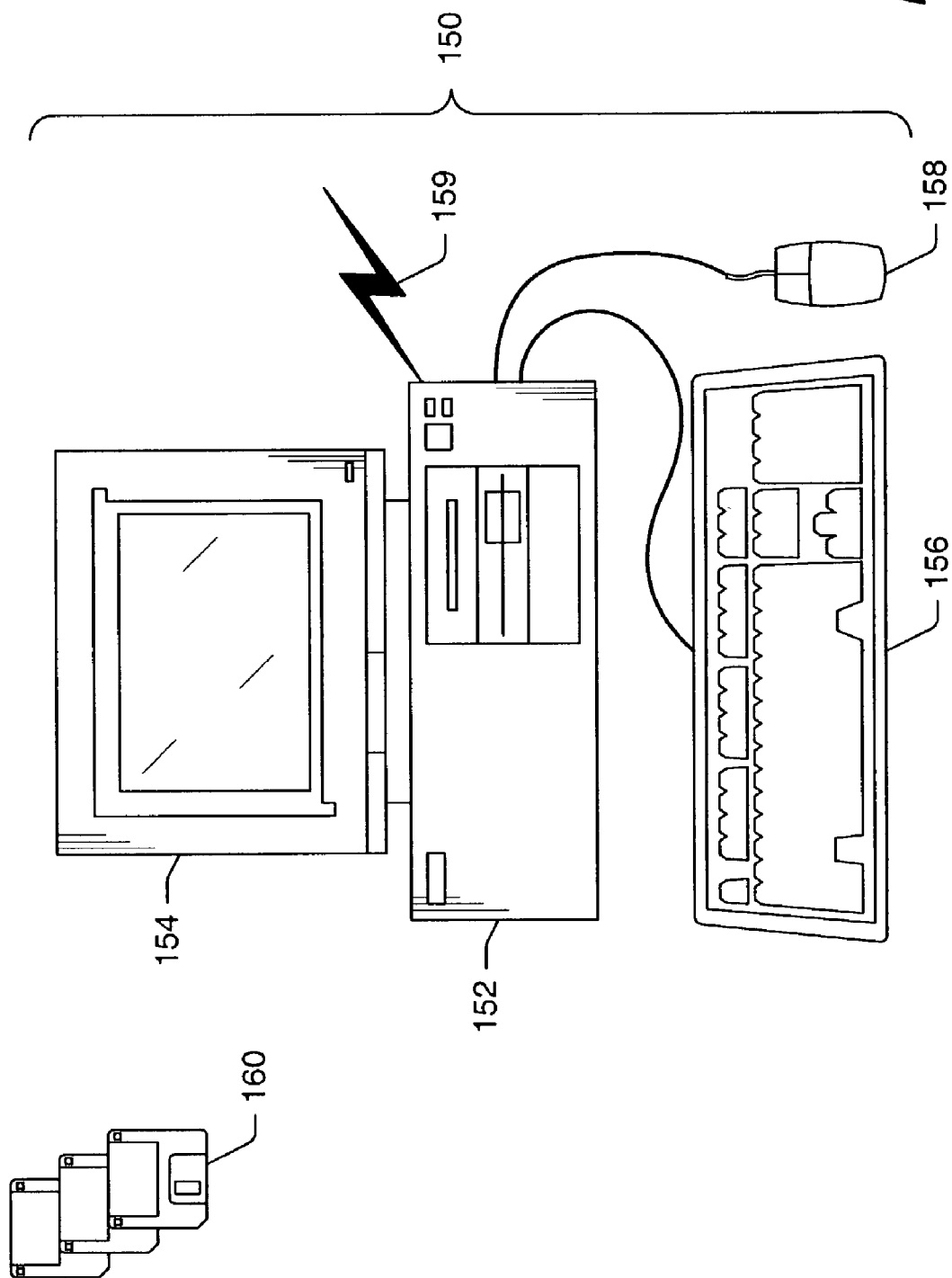
FIG. 2 depicts an embodiment of a computer system.

FIG. 2 illustrates a typical computer system 150 which may be suitable for implementing various portions of embodiments disclosed herein. Each computer system 150 typically includes components such as a CPU 152 with an associated memory medium such as floppy disks 160. The memory medium may store program instructions for computer programs, wherein the program instructions are executable by the CPU 152. The computer system 150 may further include a display device such as a monitor 154, an alphanumeric input device such as a keyboard 156, and a directional input device such as a mouse 158. Computer system 150 may be operable to execute one or more computer programs to implement embodiments described herein.

Computer system 150 preferably includes or is in communication with a memory medium on which computer programs according to various embodiments may be stored. The term "memory medium" is intended to include an installation medium, e.g., a CD-ROM, DVD, or floppy disks 160, a computer system memory such as DRAM, SRAM, EDO RAM, Rambus RAM, etc., or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network connection 159. In the latter instance, the second computer may provide the program instructions to the first computer for execution. Computer system 150 may take various forms, including a personal computer system, a mainframe computer system, a workstation, a network appliance, an Internet appliance, a personal digital assistant (PDA), a television system or another device. In general, the term "computer system" may be broadly defined to encompass any device having a processor which executes instructions from a memory medium. Additionally, a "computer system" may generally describe hardware and software components that in combination may allow execution of computer programs. Computer programs may be implemented in software, hardware, or a combination of software and hardware.

In an embodiment, a network may include one or more software applications that may be used by a network administrator to monitor and/or control various aspects of one or more computer systems coupled to the network. As used herein, one or more software applications that enable a user to monitor and/or control one or more computer systems on a network may be referred to as a "network management system." Network management systems are also known in the art by various other names including: configuration management systems and enterprise management systems. Network management systems may include, but are not limited to applications and application suites such as: Configuration Manager available from the Tivoli Software Group of IBM Corporation of Austin, Tex.; by-Control available from Bindview Corporation of Houston, Tex.; System Management Server available from Microsoft Corporation of Redmond, Wash.; and UniCenter available from Computer Associates International, Inc. of Islandia, N.Y.

Generally, a network management system (NMS) may include one or more applications installed on one or more server computers. Portions of a NMS installed on one or more servers may provide an interface used by an administrator to operate the NMS. Additionally portions of a NMS installed on one or more servers may provide monitoring and control functions which interface with one or more agent applications (hereinafter "agents") installed on one or more computer systems coupled to the network. As used herein an "agent" refers to an application installed on a first computer system which receives commands, executes commands on the first computer system and/or sends information regarding the first computer system to one or more second computer systems. For example, the second computer system may be a server. The agent may interact with an application on the server computer system to provide monitoring and/or control functionality over the first computer system to a user via the server.

In an embodiment, a NMS may interact with one or more other applications to provide data packets to one or more computer systems coupled to the network. As used herein, a "data packet" refers to a computer file in any format. Examples of data packets may include, but are not limited to: executable files, text files, graphics files, software patches and other data and application files. For example, a NMS may interact with one or more other applications to provide software updates and/or software patches to one or more computer systems coupled to a network. A process of providing software patches and/or software updates may include, but is not limited to:
- registration of hardware and/or software assets of one or more computer systems;
- auditing of one or more computer systems to discover existing hardware and software configuration;
- comparing discovered software against a master control list ("MCL") of software;
- determining whether a software version of one or more discover software applications is the desired version of the software based on the MCL;
- installing one or more software updates or software patches onto one or more computer system; and
- verifying that one or more software updates or software patches where installed correctly on one or more computer systems.

As used herein, a software application or application suite which interacts with a NMS to provide data packets to one or more computer systems of a network may be referred to as an "update system." By interacting with an existing network management system an update system may not require installation of any agents of its own on computer systems within the network. Thus, the update system may be installed on a server coupled to the network and utilize agents of the NMS to implement various functions, such as those described above. Such an embodiment may save time on large networks where installing software on individual computer systems may be cumbersome and expensive due to the distribution of the computer systems, the number of computer systems, the variety of computer systems, the variety of operating systems and/or the variety of network environments.

In an embodiment, an update system may be installed on a computer system coupled to a network. The update system may be installed on a computer system that has access to the network management system ("NMS"). For example, the update system may be installed on a server used to execute the NMS. As used herein, a server computer system upon which the NMS may be executed is referred to as a "network management system server." The update system may generate commands and send the commands to the NMS to install one or more data packets on one or more computer systems coupled to the network.

Figure 3:
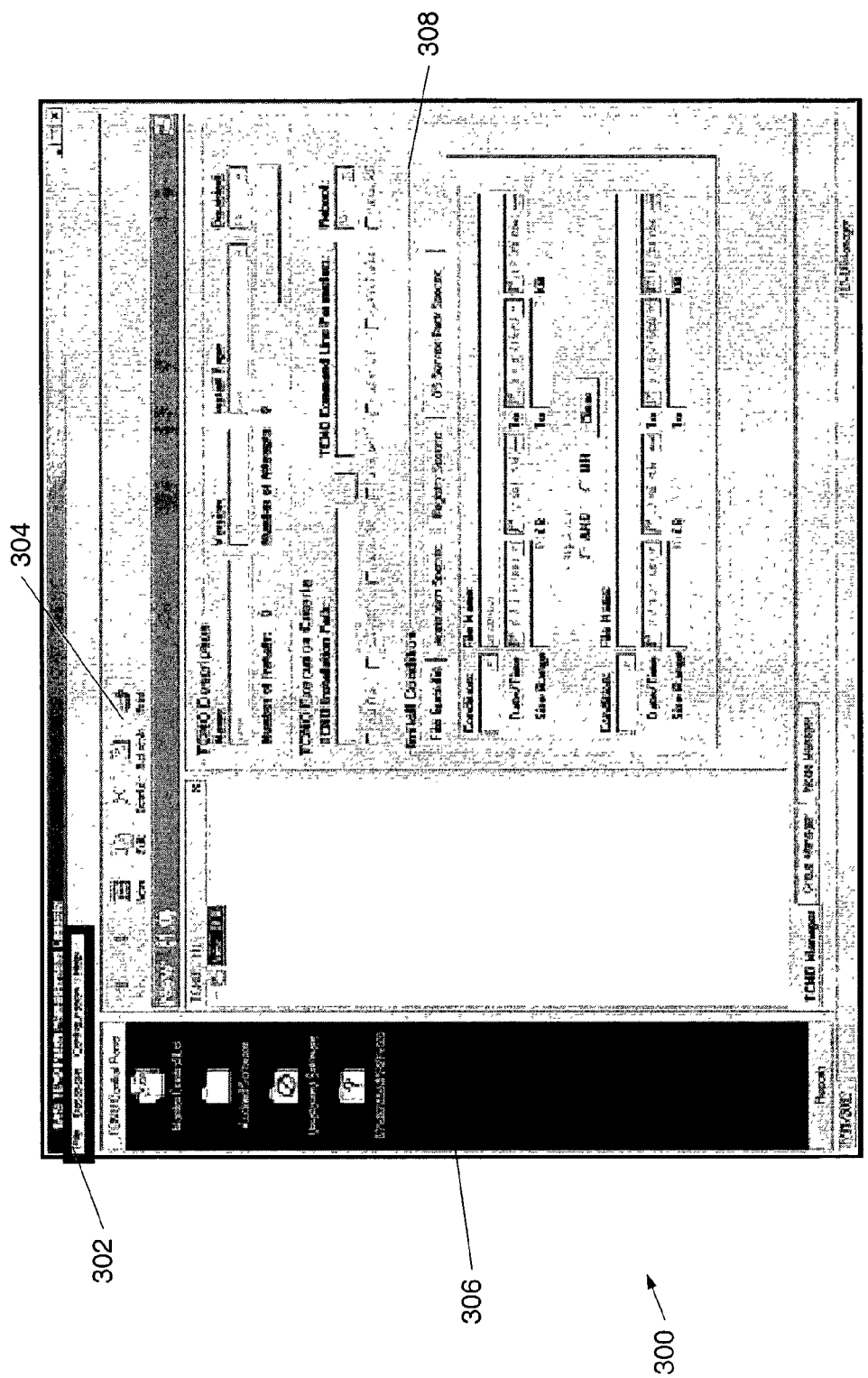
FIG. 3 depicts an embodiment of a data packet manager screen of an update system.

In an embodiment, the update system may be user configurable via a user interface. FIG. 3 depicts an exemplary embodiment of a configuration screen of an update system. A user interface screen of an update system may include a number of input and/or display elements to enable a user to provide and/or review configuration information. For example, FIG. 3 depicts an embodiment of a data packet manager screen 300 of an update system. Data packet manager screen 300 includes a main tool bar 302, one or more supplemental tool bars 304, a view control tool bar 306, and one or more interface screens 308. In an embodiment, a user may interact with elements of tool bars 302, 304 and/or 306 to display one or more desired interface screens 308. Tool bars may also provide other functions as are well known in the art (e.g., closing the update system, providing access to a context sensitive help feature, refreshing data displayed in an interface screen, etc.).

Figure 4:
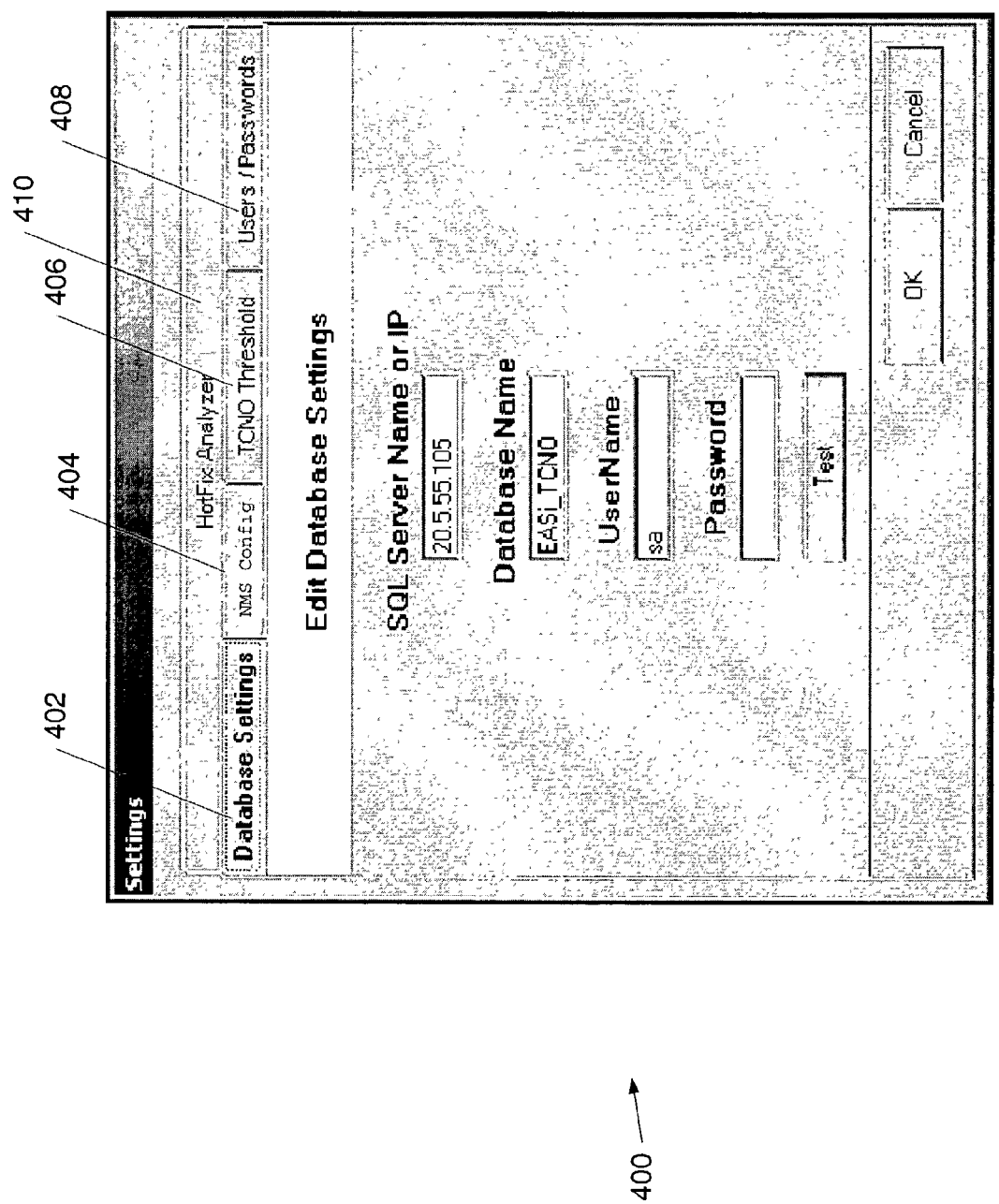
FIG. 4 depicts an embodiment of a settings screen 400 of an update system.

In an embodiment, a user interface of an update system may provide a settings screen to allow a user to configure interfaces between portions of the update system, interfaces between the update system and the network management system and other system wide update parameters. FIG. 4 depicts an exemplary embodiment of a settings screen 400 of an update system. Settings screen 400 may include tabs for selecting one or more aspects of the update system for configuration. For example, a database settings tab 402 may be selected (as shown in FIG. 4) to configure an interface between the update system and one or more databases used to store update system data. For example, one or more databases may be used to store update system parameters, data packets and/or data packet distribution criteria.

Figure 6:
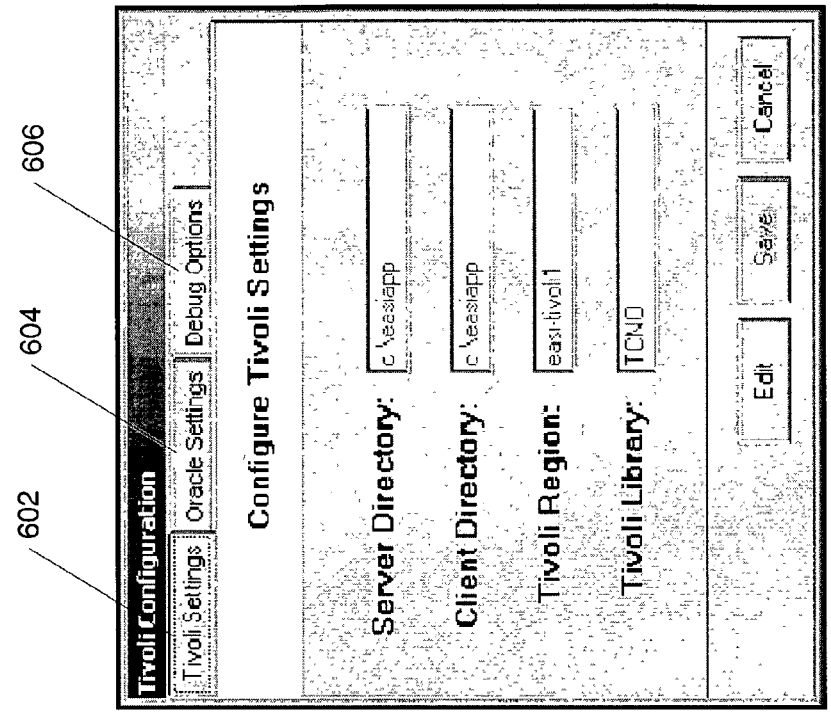
FIG. 6 depicts an embodiment of a network management configuration screen of an update system.
Figure 5:
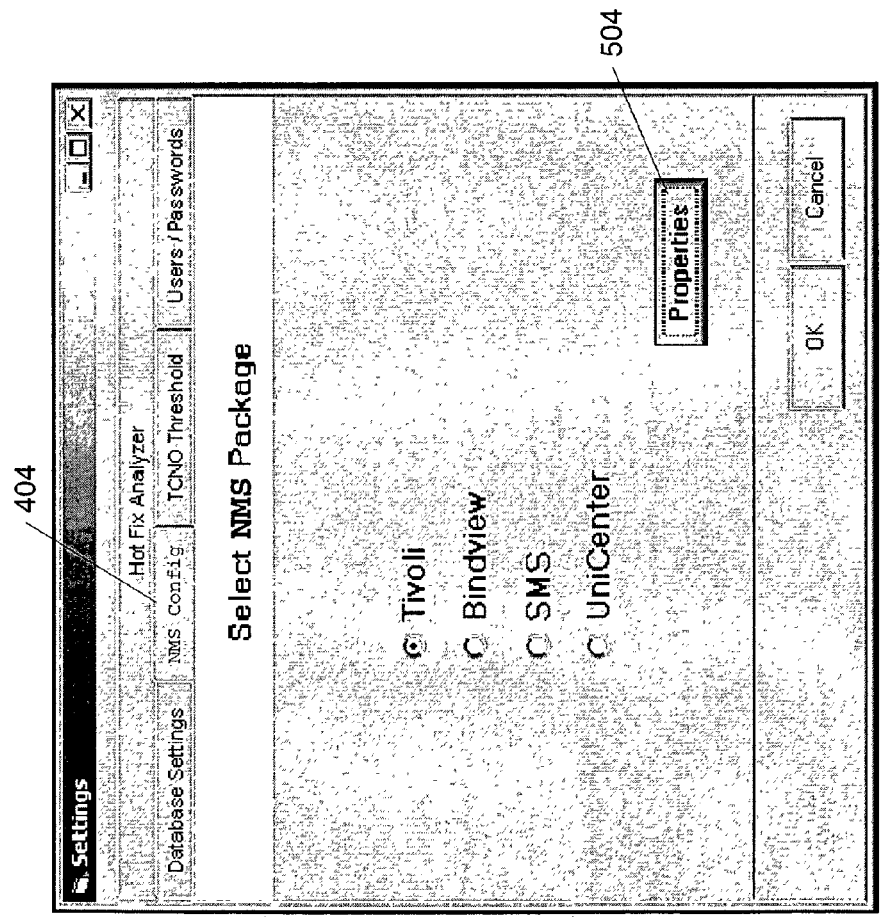
FIG. 5 depicts an embodiment of a settings screen for configuring an interface between an update system and a network management system.

In an embodiment, settings screen 400 may also include a NMS tab 404 for configuring an interface between the update system and a network management system, as depicted in FIG. 5. NMS tab 404 may allow a user to specify a NMS that exists or will exist on the network. Specifying the NMS allows the update system to determine a command structure (e.g., command syntax, etc.) used by the NMS. NMS configuration screen 600 (as depicted in FIG. 6) may be displayed in response to selecting properties button 504. NMS configuration screen 600 may include a number of tabs for configuring various portions of the NMS/update system interface. The particular configurable options displayed in NMS configuration screen 600 may be determined based on the NMS specified in NMS tab 404. For example, a Tivoli configuration screen is depicted in FIG. 6 since Tivoli was selected on NMS tab 404. However, if another NMS had been specified different configuration options may have been displayed in NMS configuration screen 600.

NMS configuration screen 600 may include a NMS settings tab 602. NMS settings tab 602 may allow a user to specify directory path and name options for accessing the NMS. NMS configuration screen 600 may also include a database settings tab 604 for configuring access information regarding one or more databases utilized by the NMS. One or more tabs may also be provided for configuring options of the NMS that may be utilized by the update system. For example, debug options tab 606 may be utilized to set debug options for the NMS to use when providing data packets to one or more computer systems.

Figure 7:
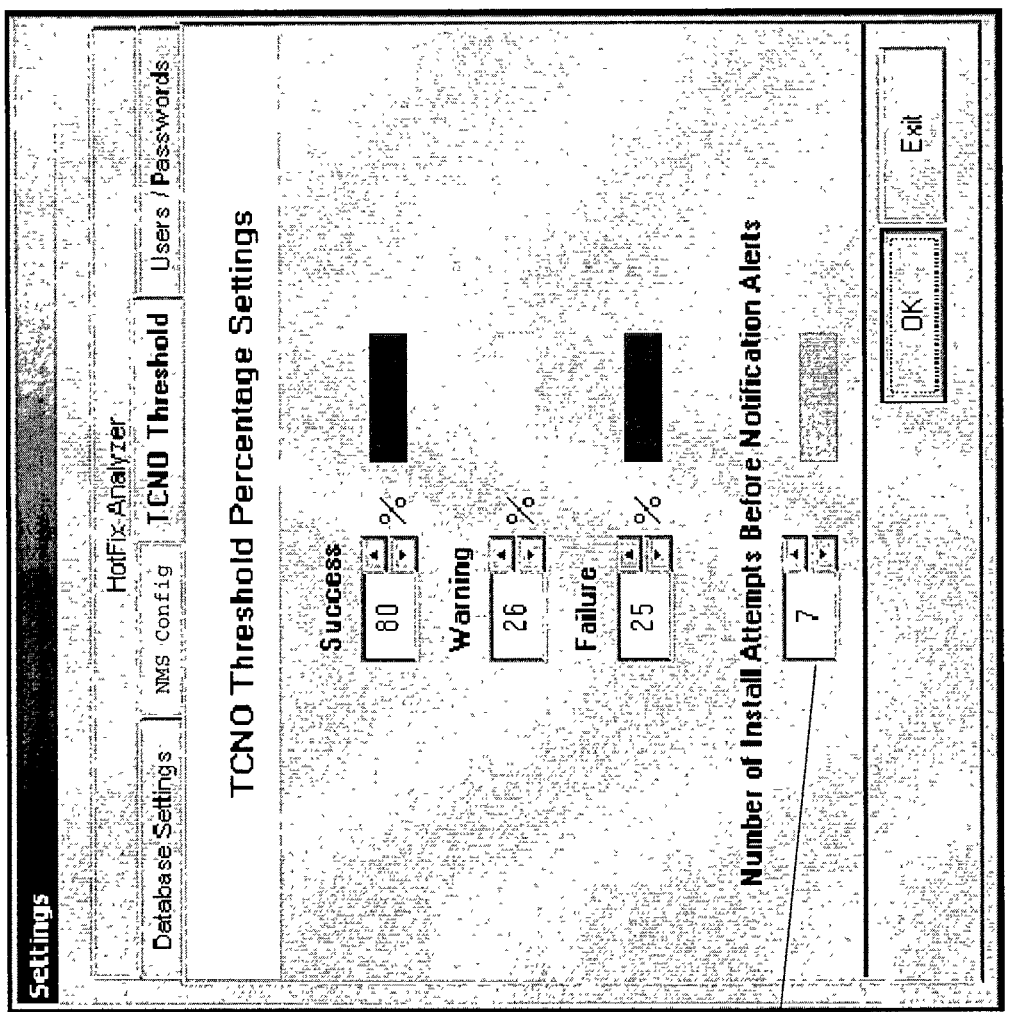
FIG. 7 depicts an embodiment of a thresholds settings screen of an update system.

In an embodiment, update system settings screen 400 may include one or more additional tabs for configuring update system options. For example, a thresholds tab 406 may be provided, as depicted in FIG. 7. Thresholds tab 406 may allow a user to configure threshold values for sending one or more data packets to one or more computer systems coupled to the network. For example, as depicted in FIG. 7, threshold values may include values used to determine whether an attempt to send a number of data packets to a number of computer systems was successful or not. In the threshold tab screen depicted in FIG. 7, a success threshold has been set at 80%. Thus, if 80% or more of the data packets are successfully received by their intended computer systems, the update system may indicate to the user that the action was successful. Such customized thresholds may assist the user in determining high priority or critical concerns. For example, a screen may be provided which summarizes how many computer systems on the network have received a particular data packet. The screen may color code icons representing computer systems or groups of computer systems to allow the user to make a quick assessment of the deployment status of the data packet.

Other threshold values may also by be set by the user. For example, a number of installation attempts before notification may be established by the user. The number of installation attempts threshold 702 may determine how many times the update system will try to send a data packet to a particular computer system before alerting the user that there is a problem in sending the data packet. The notification may be via an active messaging system (e.g., email, pager notification, etc.) or via a passive notification such as applying a color code to the computer system in reports requested by the user. Additionally, number of installation attempts threshold 702 may be used to determine whether other actions should be taken. For example, if a computer system has met or exceeded number of installation attempts threshold 702 the update system may inhibit access to the network via the computer system. Alternately, a user of the computer system may be inhibited from logging on to the computer system or network. For example, in an embodiment, the computer system may be logged off of the network. The computer system may not be allowed to log on to the network until the data packet has been successfully installed.

An update system settings screen 400 may include one or more tabs for configuring update system access options. For example, a users/passwords tab 408 may be provided. Settings screen 400 may also include one or more tabs for configuring user options of one or more tools accessible via the update system. For example, in an embodiment, one or more commercially available software applications may be accessible from within the update system. As depicted in FIG. 4, settings screen 400 includes a HotFix Analyzer tab 410. HotFix Analyzer is a software application commercially available from Microsoft Corp. of Redmond, Wash. HotFix Analyzer checks computer systems configuration information against a list of security patches maintained by Microsoft. HotFix Analyzer tab 410 may allow the user to provide configuration parameters for accessing and executing HotFix Analyzer from within the update system.

The update system may be utilized to configure options related to distributing one or more data packets to one or more computer systems. A number of user interface screens may be available to the user for configuring distribution options. A number of embodiments of distribution configuration screens are discussed below. The specific layout and features illustrate ways that distribution configuration screens may be organized.

Figure 8:
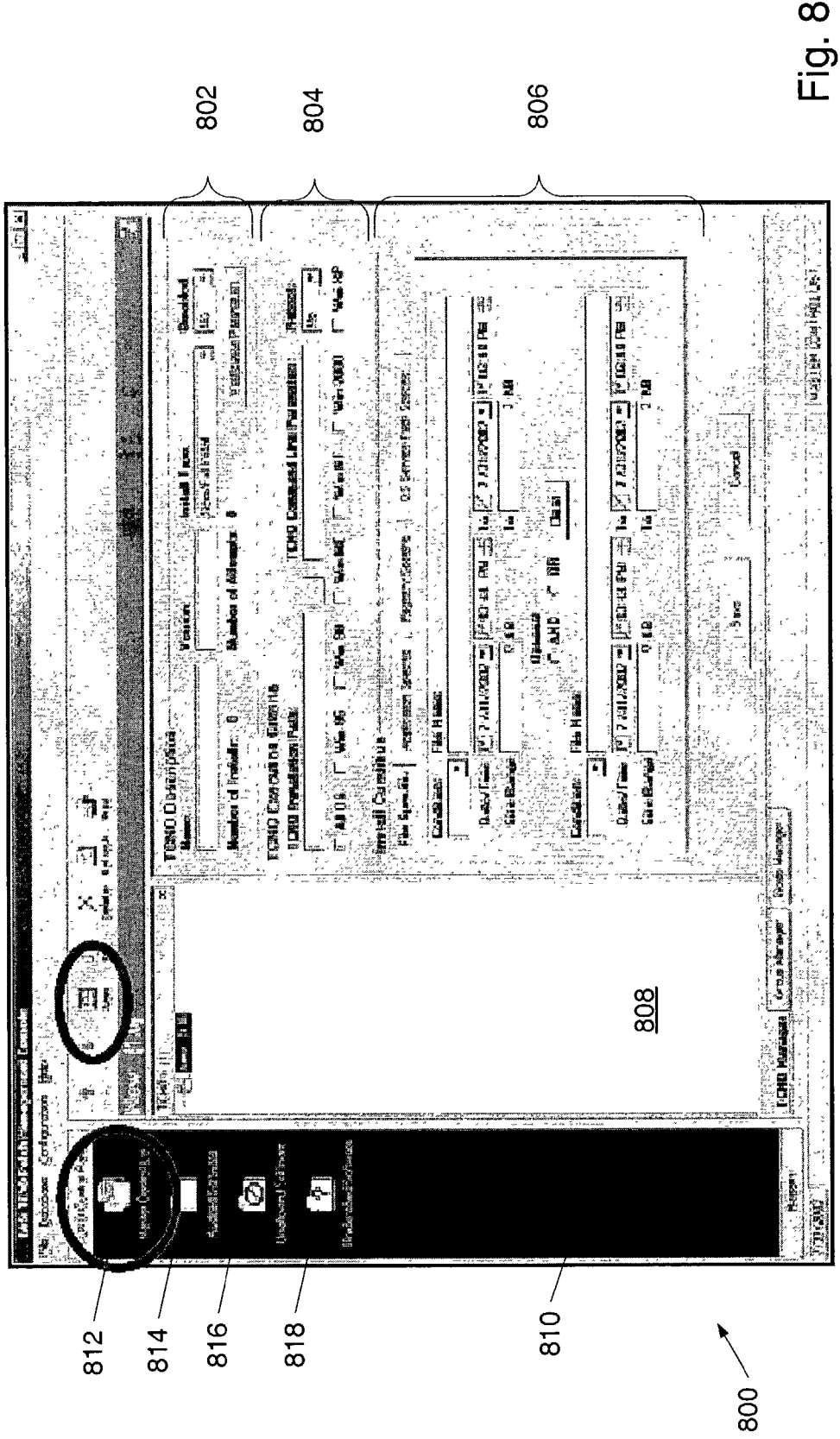
FIG. 8 depicts an embodiment of a data packet manager screen of an update system.

In an embodiment, a master control list (MCL) may be associated with an update system. An MCL may identify data packet names, versions, version dates and/or other identifying information regarding data packets expected to be encountered on computer systems coupled to the network. The MCL may further indicate whether one or more data packets are allowed or prohibited. The update system may provide an interface for maintaining the MCL, as depicted in FIG. 8. Data packet management screen 800 may include a number of sections for providing various information regarding a data packet. For example, data packet management screen 800 may include an identification section 802, an installation section 804, and/or a condition section 806.

Figure 9:
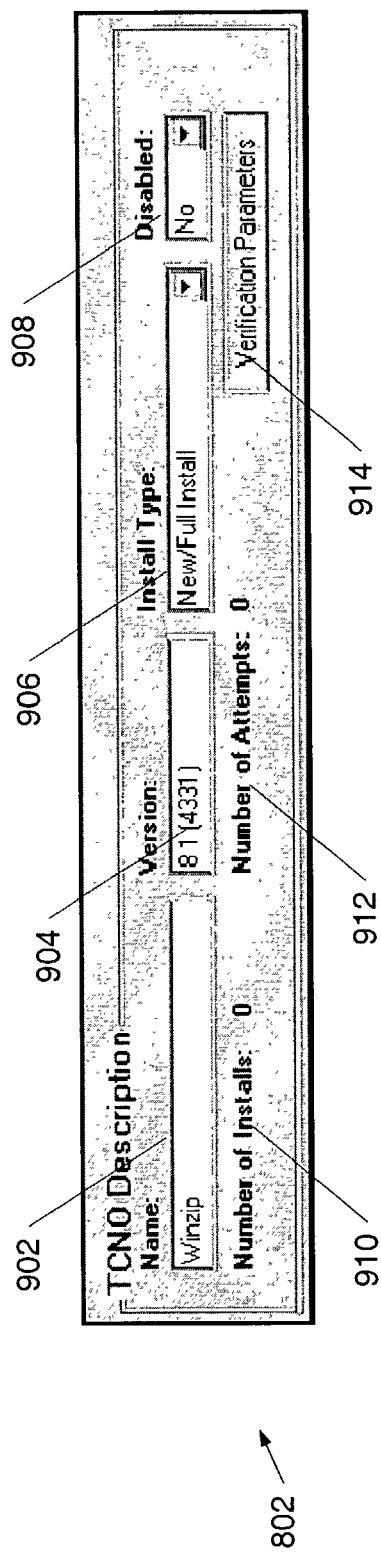
FIG. 9 depicts an embodiment of an identification section of a configuration window.

A close up view of identification section 802 is shown in FIG. 9. Identification section 802 may allow a user to enter identifying information related to a data packet such as, but not limited to: data packet name 902, version 904, type of installation 906 (e.g., full, patch, etc.), and whether the data packet is disabled from being sent 908. Additionally, identification section 802 may display the number of computer systems upon which the data packet has been successfully installed 910 and the number of times the update system has attempted to install the data packet on computer systems coupled to the network 912. A verification parameters button 914 may bring up a verification parameters screen. The verification parameters screen may allow the user to set parameters to be used by the update system to determine whether the data packet already exists on a computer system. For example, the user may define a data packet name, version and/or file path to be searched. If a data packet matching the verification parameters is found on a computer system, then the update system will not attempt to install the data packet identified in identification section 802. However, the update system may be updated to indicate that the identified data packet exists on the computer system.

Figure 10:
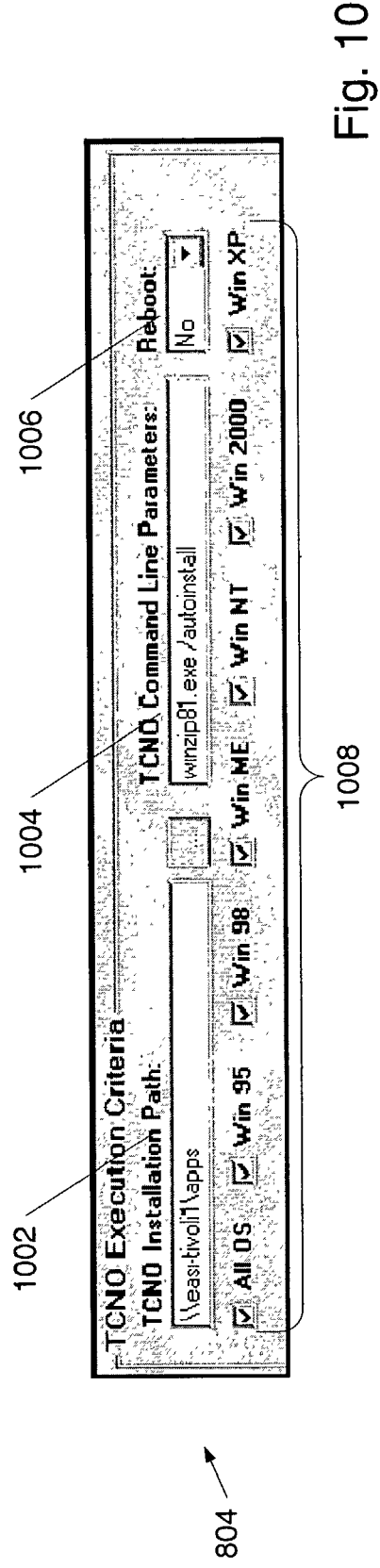
FIG. 10 depicts an embodiment of an installation section of a configuration window.

FIG. 10 depicts a close up view of installation section 804. Installation section 804 may include information regarding the installation of the data packet on one or more computer systems. For example, installation information may include, but is not limited to: installation path 1002, command line parameters related to the installation 1004 and whether the installation requires rebooting the computer system after the data packet is loaded 1006. Additionally, installation section 804 may allow the user to select operating systems that the data packet is valid for 1008.

FIGS. 11A, 11B, 11C and 11D depict various views of condition section 806 with different tabs selected. Condition section 806 may be used to configure conditions for the installation of the data packet on a particular computer system or group of computer systems. Tabs 1102, 1104, 1106 and 1108 allow the user to specify different types of conditions.

FIG. 11A depicts a view of condition section 806 with file tab 1102 selected. File tab 1102 may allow a user to specify one or more conditions related to whether or not a file exists on a computer system. A file condition may be directed to any file of any file type. The user may specify a file name in file name field 1112. A date range for creation or modification of the file may be specified in data/time fields 1114. A size range for the file may be specified in size range fields 1116. Condition field 1110 may allow the user to choose whether to install the data packet on computers systems on which the specified file exists or on computer system on which the specified file does not exist. If so desired, one or more additional file conditions may be added. If additional file conditions are added, a Boolean field 1118 may allow the user to specify whether multiple conditions must all be met or whether only one or more conditions need to be met for the data packet to be installed on a computer system.

Figure 11B:
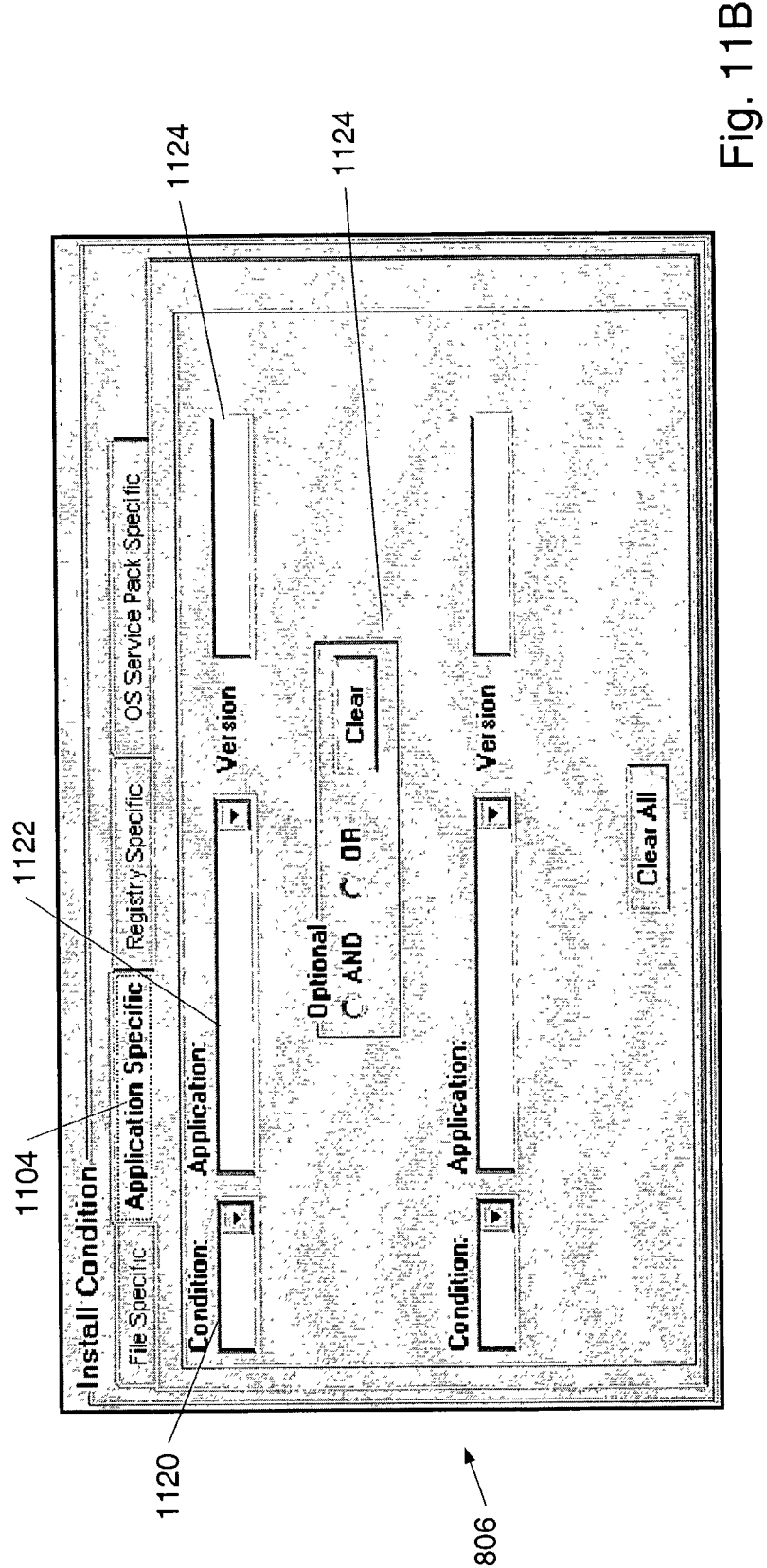
FIG. 11B depicts an embodiment of a condition section of a configuration window with the applications tab selected.

FIG. 11B depicts a view of a condition section 806 with an application tab 1104 selected. As on the file tab, the application tab may include a condition field 1120, a name field 1122 and one or more Boolean fields 1124. Additionally, application tab 1104 may include a version field 1126. In an embodiment, a condition specified on application tab 1104 may be checked against information in an update system database rather than on the computer system. For example, an application condition for a first data packet may specify that the data packet should only be installed on computer systems that are also assigned to receive a second data packet. Thus, the second data packet need not be actually present on the computer system.

Figure 11C:
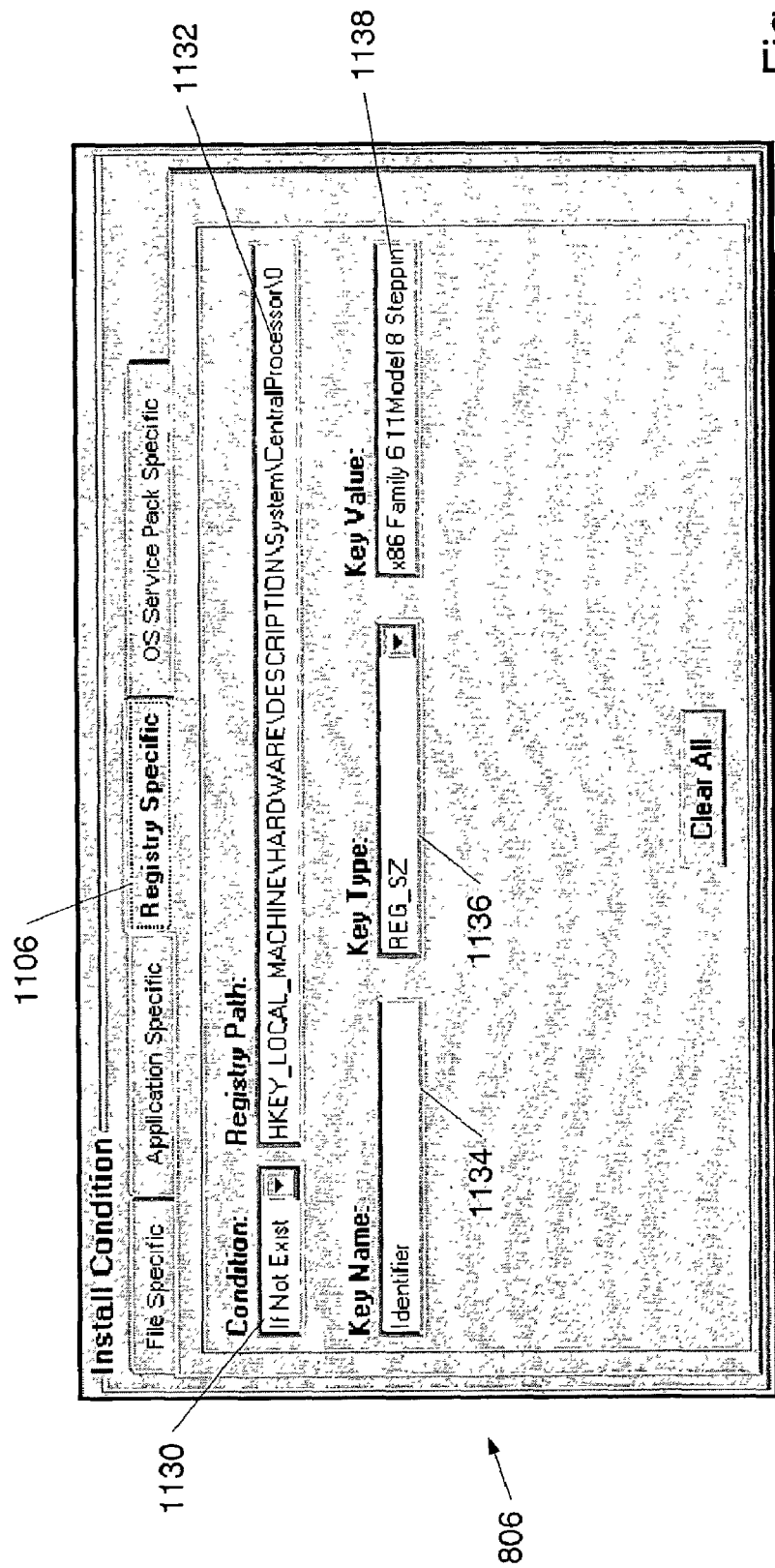
FIG. 11C depicts an embodiment of a condition section of a configuration window with the registry tab selected.

FIG. 11C depicts a view of a condition section 806 with a registry tab 1106 selected. Registry tab 1106 may allow the user to specify one or more criteria related to the content of the system registry of a computer system. Registry tab 1106 may include a condition field 1130 as previously described. Additionally, a registry path field 1132 may allow the user to define a file path to search for the system registry. Key name field 1134, key type 1136 and key value 1138 may allow the user to specify conditions to search for in the system registry.

Figure 11D:
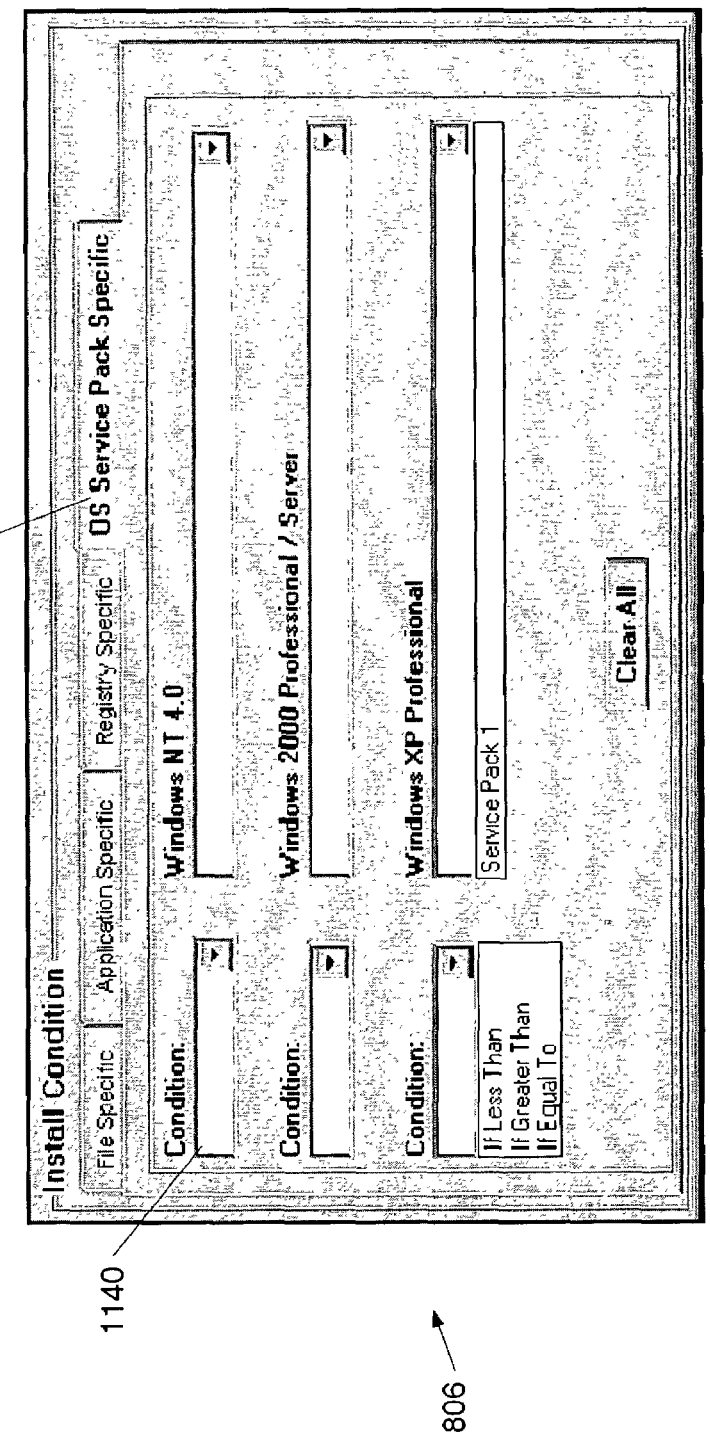
FIG. 11D depicts an embodiment of a condition section of a configuration window with the operating system tab selected.

FIG. 11D depicts a view of a condition section 806 with an operating system tab 1108 selected. Operating system tab 1108 may allow the user to specify a condition related to an operating system version (e.g., service pack) of a computer system. A condition field 1140 in operating system tab 1108 may allow the user to specify a relationship that must be met for a computer system's operating system to meet the condition. For example, condition field 1140 may allow the user to specify whether the operating system must be greater than, less than, or equal to the defined version in order for the computer system to meet the condition.

A data packet described on data packet management screen 800 may be added to the master control list. Data packets already present on the MCL may also be edited in data packet management screen 800. For example, a data packet to be edited may be selected in a list window 808. Data related to the data packet may be displayed in the sections previously discussed.

In an embodiment, data packet management screen 800 may include a view window 810. View window 810 may allow the user to select from several sets of data to view. Selections available to the user in view window 810 may include, but are not limited to: master control list 812, known data packets 814, prohibited data packets 816 and unknown data packets 818. Master control list selection 812 may allow the user to view data packets identified on the master control list. Known data packets selection 814 may allow the user to view all known data packets identified on the network during a scan of the network. As used herein a "known" data packet refers to a data packet that is present on a list of recognized data packets available to the scanning application. Prohibited data packets selection 816 may allow a user to view data packets on the network that are identified in a prohibited data packets list. Unknown data packets selection 818 may allow the user to view data packets that were detected during a scan of the network, but which do not appear on the list of recognized data packets available to the scanning application.

Figure 12:
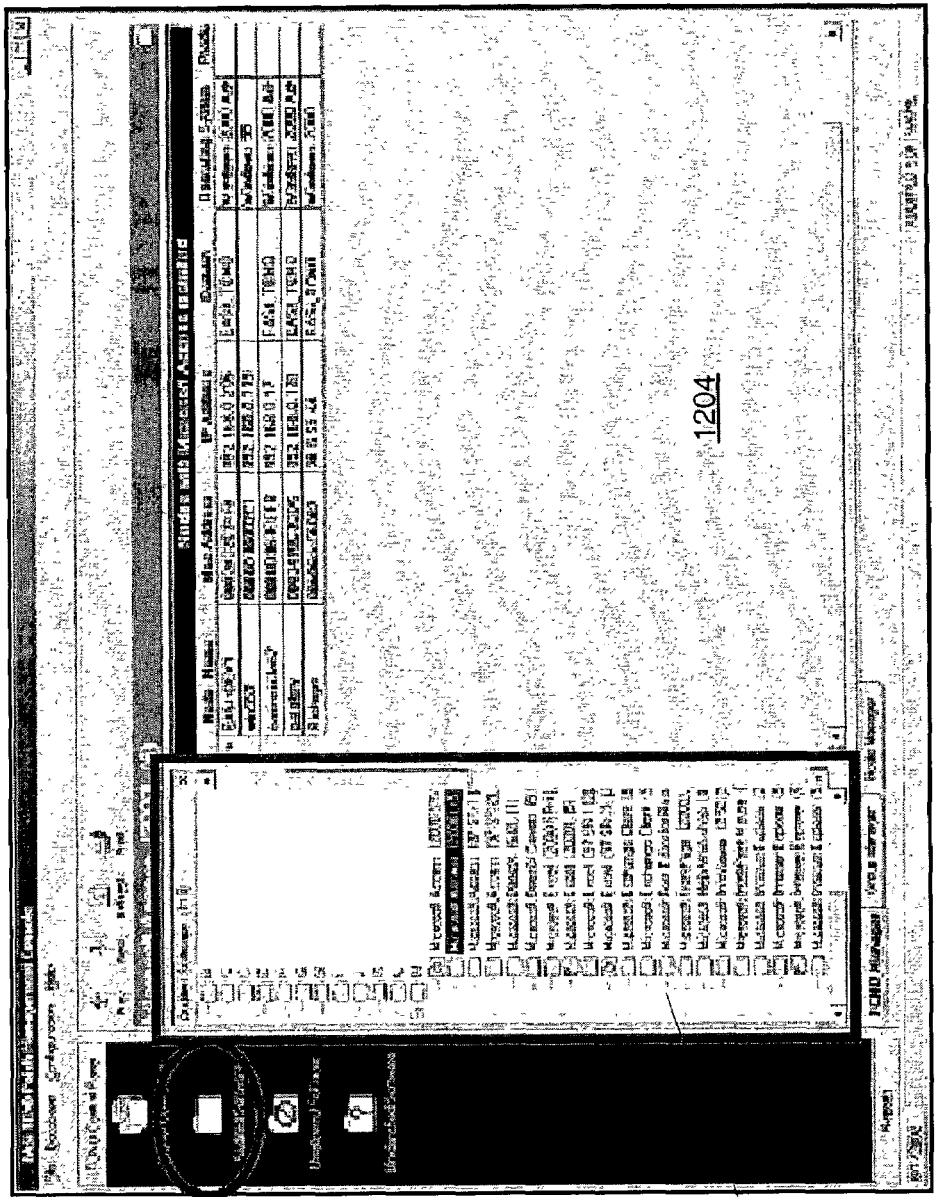
FIG. 12 depicts an embodiment of an audited data packets screen of an update system.

Known data packets selection 814, prohibited data packets selection 816 and unknown data packets selection 818 may be collectively referred to as audit selections since information presented in these views is acquired by auditing (or scanning) the network. Selecting an audit selection may cause an audited data packets screen 1200 to be displayed, as depicted in FIG. 12. Audited data packets screen 1200 may include an audit list window 1202. Audit list window 1202 may include an alphabetical list of data packets falling into the selected audit selection category. If a particular data packet is selected in audit list window 1202, a list of computer systems having the selected data packet may be displayed as nodes in data packet window 1204.

In an embodiment, an audit selection category of a data packet may be changed by selecting the data packet in audit list window 1202 and selecting a menu option. For example, an unknown data packet may be added to the list of recognized data packets available to the scanning application. Similarly, a data packet may be added to the MCL or prohibited data packets list by selecting an appropriate menu option. If a version of a data packet desired to be distributed to one or more computer systems is identified in audit list window 1202, the data packet may be assigned to one or more computer systems by selecting an appropriate menu option. To assign a selected data packet for distribution to one or more computer systems, a data packet manager screen 800 as previous discussed may be displayed. Data acquired during the network audit may be pre-populated into appropriate portions of the opened data packet manager screen.

In an embodiment, an icon may be associated with various types of data packets displayed. That is, known data packets may be indicated by a first icon, unknown data packets by a second icon, etc. Changing the audit selection category of a data packet may cause the associated icon to be changed as well.

Figure 13:
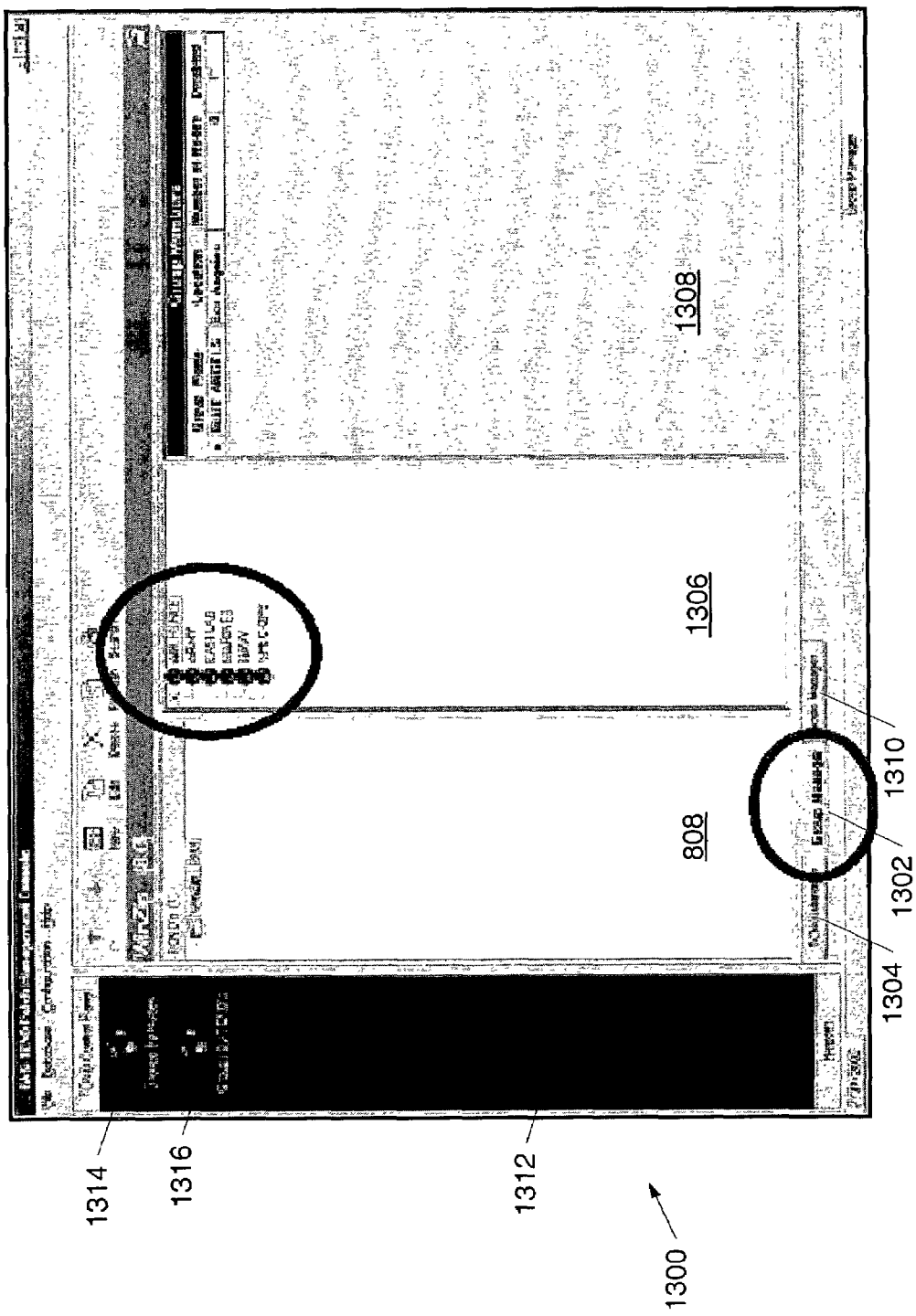
FIG. 13 depicts an embodiment of a group manager screen of an update system.

In an embodiment, an update system may allow computer systems coupled to a network to be assigned to management groups. For example, as depicted in FIG. 13, the update system may include a group manager screen 1300. Group manager screen 1300 may display a hierarchy of groups in a hierarchy window 1306. Additionally, a list of one or more computer systems assigned to a particular group may be displayed in a group members window 1308. In some embodiments, list window 808 may also be displayed on group manager screen 1300. In some embodiments, a user may alternate between a data packet management view (such as data packet manager screen 800) and a group management view (such as group manager screen 1300) by selecting a data packet tab 1304 or a group tab 1302. Additionally, in some embodiments, a node tab 1310 may enable a user to view information related to an individual computer system as discussed further below.

Using group manager screen 1300, the user may assign one or more computer systems to one or more groups. In an embodiment, computer systems may be assigned to groups according to criteria determined by the user. For example, a computer system may be assigned to a group according to computer system parameters such as operating system, hardware configuration, location, etc. In another example, computer systems may be assigned to groups according to arbitrary criteria determined by the user or in any other manner deemed appropriate by the user to form a hierarchy of groups. Additionally, in some embodiments, subgroups may be formed within groups. Names and/or other descriptive information may be assigned to each group or subgroup to assist the user in determining which computers systems are likely to be assigned to each group.

In an embodiment, group manager screen 1300 may include a view window 1312. View window 1312 may allow the user to arrange data displayed in group manager screen 1300 in a desired manner. Selections available to the user in the group manager screen view window may include, but are not limited to: group by nodes 1314 and group by assigned data packets 1316.

Figure 14:
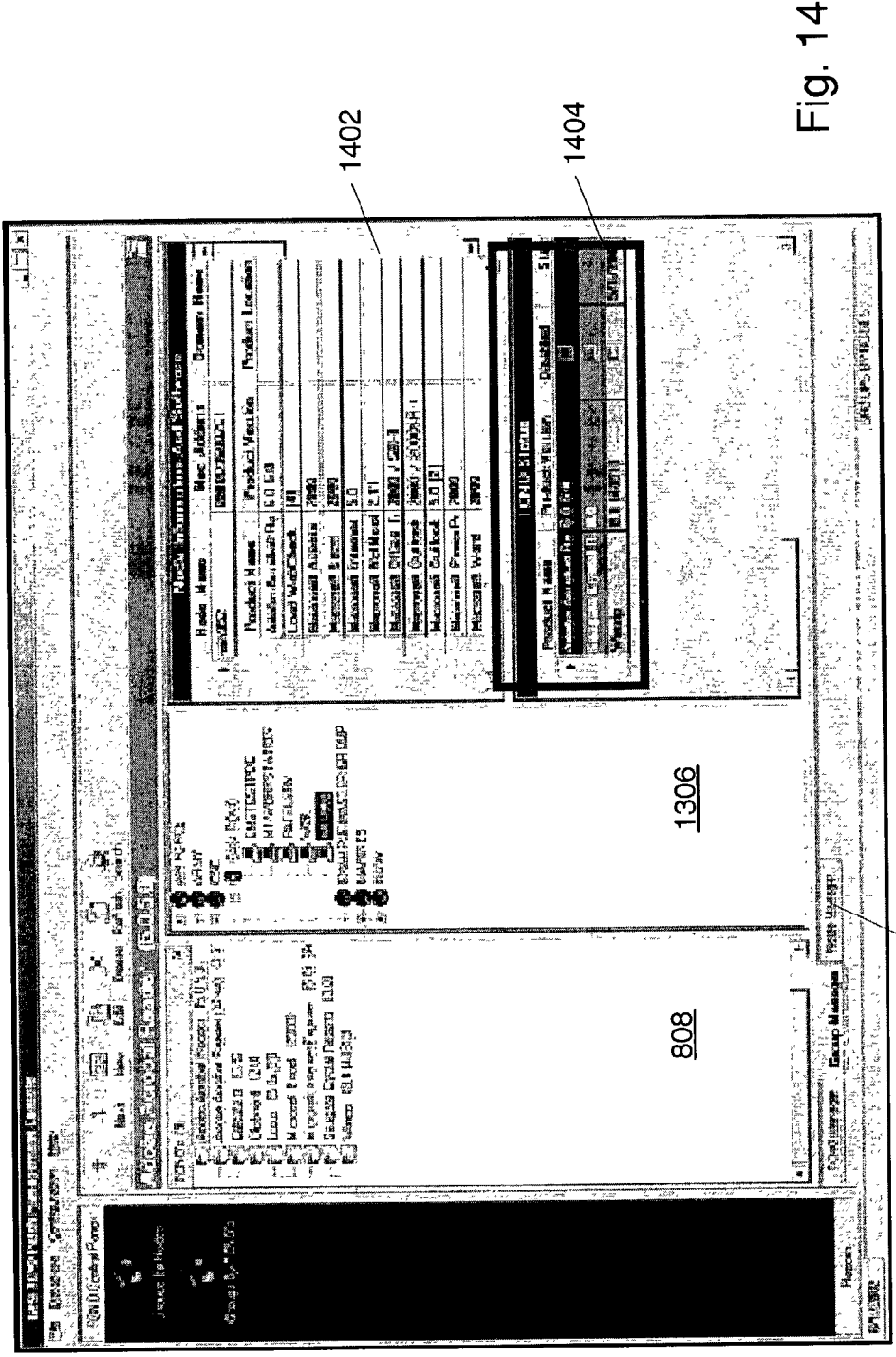
FIG. 14 depicts an embodiment of a group manager screen with a node selected in the hierarchy window.

A "group by nodes" view of a group manager screen is depicted in FIG. 13. Expanding a group (e.g., by selecting a "+" icon associated with the group in hierarchy window 1306) may cause subgroups and/or nodes assigned to the group to be listed in hierarchy window 1306, as shown in FIG. 14. Selecting a group or subgroup in hierarchy window 1306 may cause group members window 1308 to change to include an associated data packets pane 1402 and a status of node members pane 1404. Associated data packets pane 1402 may list data packets assigned to the selected group or subgroup. Status of node members pane 1404 may display the installation status of assigned data packets. Status of node members pane 1404 may include information for data packets assigned to the selected group or subgroup including, but not limited to: data packet identification information, number of attempts to install the data packet, installation information (e.g., install time and date), whether the installation was successful, whether errors were reported, and whether the installation has been verified by a subsequent network audit. Additionally, assigned data packets may be color coded in the display to make status identification easier. For example, a data packet installation that is considered complete (e.g., the data packet has been installed and verified) may be highlighted in blue, a data packet installation that is considered incomplete (e.g., the installation has not been verified or has not been executed) may be highlighted in gray, and a data packet installation that has met or exceeded an allowed number of unsuccessful installation attempts (e.g., number of installation attempts threshold 702) may be highlighted in orange.

Figure 15:
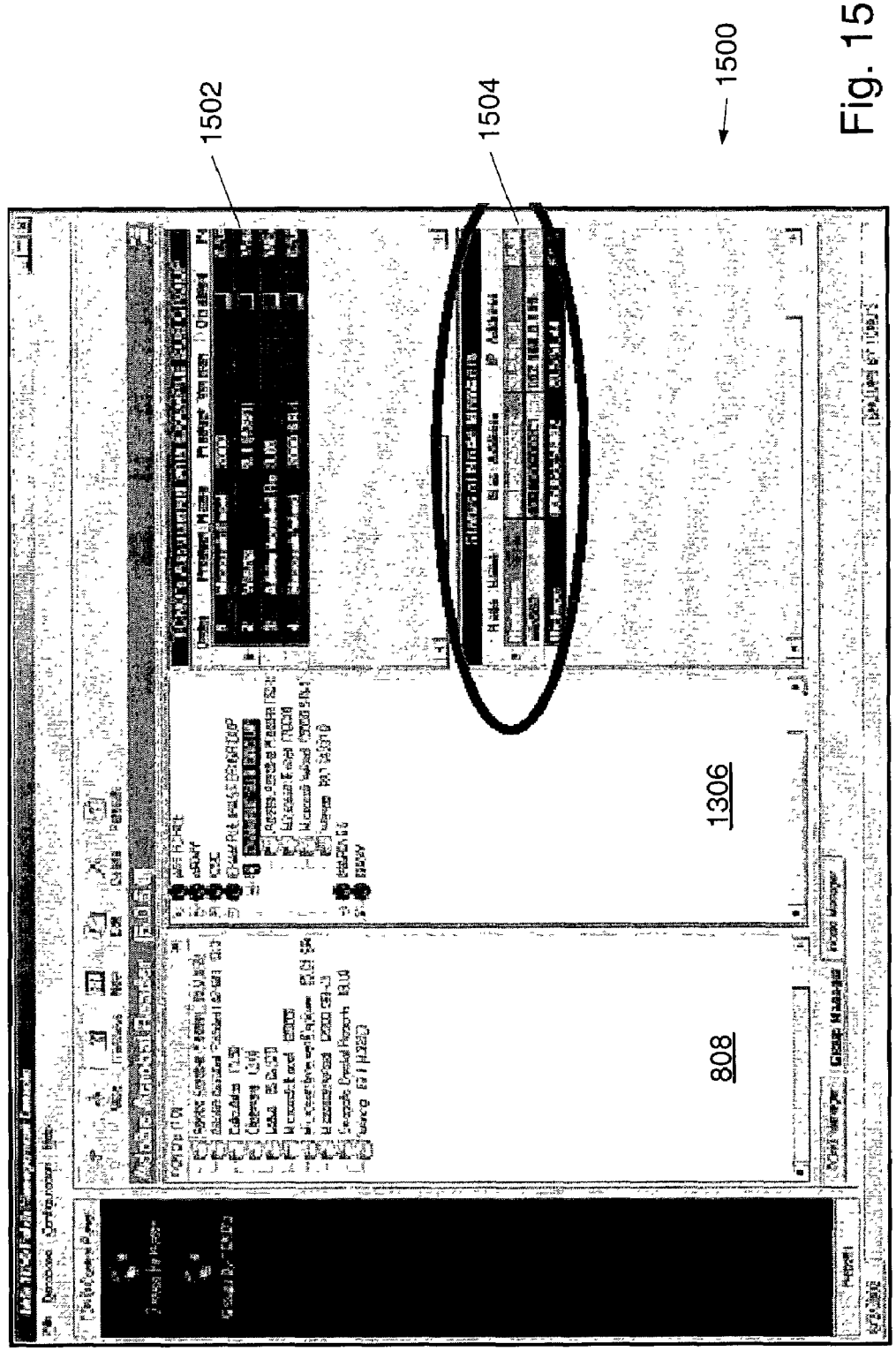
FIG. 15 depicts an embodiment of a group manager screen in a group by assigned data packets view.

FIG. 15 depicts an exemplary embodiment of a group manager screen 1500 in "group by assigned data packets" view. In the "group by assigned data packets" view, hierarchy window 1306 includes groups and subgroups as before. However, rather than displaying nodes associated with each group or subgroup, hierarchy window 1306 displays a list of data packets assigned to each group or subgroup. If a group or subgroup is selected in hierarchy window 1306, the list of data packets window assigned to the selected group or subgroup is displayed in assigned data packets window 1502. If a data packet is selected in assigned data packets window 1502, status of installation of the data packet on each node of the group or subgroup is displayed in status window 1504. Installation status may be displayed as previously described.

Assigned data packets window 1502 may display data packets in the order they are scheduled to be installed on the selected group or subgroup. Thus, the first data packet listed is the next data packet to be installed on the selected group or subgroup. The user may change the scheduled order by dragging and dropping or by using a pull down menu selection available by selecting a data packet. Thus, if a more urgently needed data packet (e.g., a security patch) is currently scheduled last, the user may drag and drop the more urgent data packet to the first position, or select a change order menu option to move the more urgent data packet forward.

Figure 16:
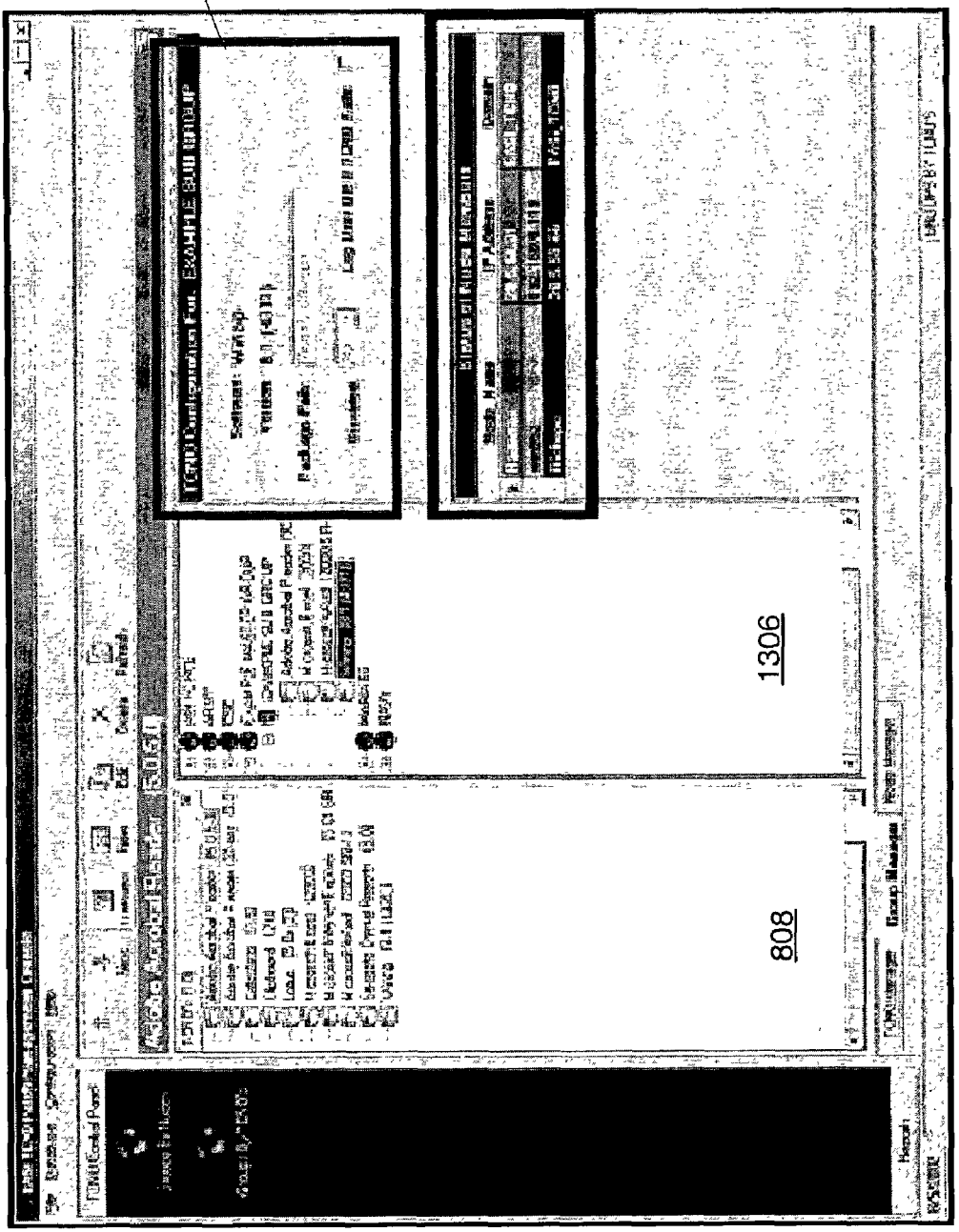
FIG. 16 depicts an embodiment of a configuration for group window with a data packet selected in hierarchy window.

In an embodiment, the user may select an assigned data packet to review details regarding the data packet. For example, FIG. 16 shows a configuration for group window 1602 for the data packet selected in hierarchy window 1306. Configuration for group window 1602 may include information related to the data packet such as data packet name, data packet version, location of the data packet in a memory (e.g., file path), whether the data packet is disabled from being installed, etc.

Figure 17:
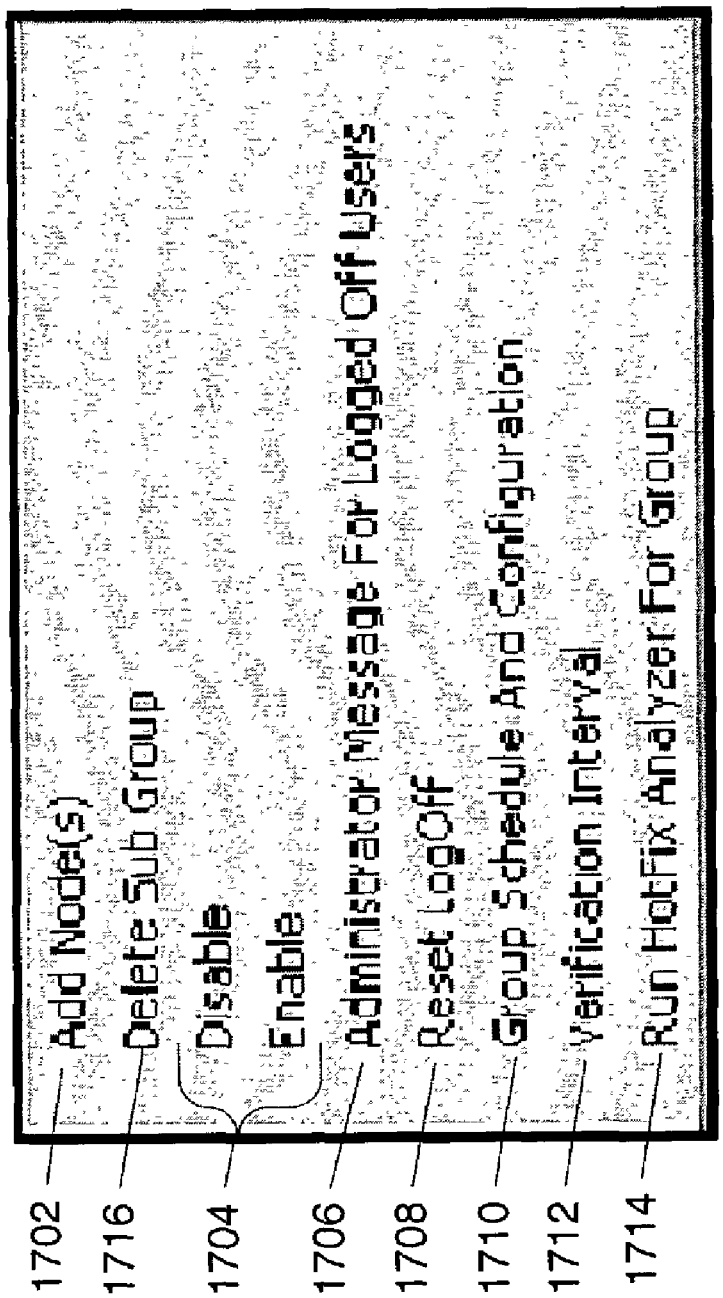
FIG. 17 depicts an embodiment of a groups/subgroups pull down menu.

From group manager screen 1300, the user may set various parameters associated with groups and/or subgroups. For example, a group/subgroup pull down menu 1700, similar to the one depicted in FIG. 17, may be available to the user if a group or subgroup is selected. A similar pull down menu may be available to the user upon selection of an individual node. Options available on group/subgroup pull down menu 1700 may include an option to add subgroups and/or nodes 1702, and an option to delete a group or subgroup 1716. A group or subgroup may also be enabled or disabled by selecting enable or disable options 1704. If the group or subgroup is disabled, then no data packets may be scheduled to be sent to the group or subgroup. "Administrator message for logged off users" option 1706 may allow the user of the update system to prepare a free form text message to be sent to a user of a computer system if the computer system user is forcibly logged off of the network by the update system. Similarly, a reset logoff option 1708 allows a user of the update system to reset a parameter associated with a computer system which indicates that the computer system is prohibited from logging on to the network.

Several scheduling options may also be available to the user. For example, the user may select group schedule and configuration option 1710 to view configuration information regarding the selected group or subgroup. Selecting group schedule and configuration option 1710 may also display the schedule for sending one or more data packets to computer systems assigned to the group or subgroup. Group schedule and configuration option 1710 may allow the user to specify a date range during which the update system is to attempt to send data packets to the selected group or subgroup. Alternately, the user may be able to specify a frequency at which the update system will attempt to send data packets to the selected group or subgroup. For example, the update system may attempt to send data packets to a group or subgroup on a daily, weekly, monthly or other basis. The user may also be able to specify a particular time within the established frequency that data packets should be sent. For example, data packets may be sent daily between 1 a.m. and 2 a.m. In another example, data packets may be sent weekly on Sunday mornings. Group schedule and configuration option 1710 may also allow a user to disable an update schedule configured for the group or subgroup. This feature may be useful if the schedule needs to be bypassed temporarily, but the user does not want to configure a new schedule or loose the old schedule. Group schedule and configuration option 1710 may also allow the user to configure options related to how users of computers systems assigned to the selected group or subgroup perceive receiving sent data packets. For example, the update system may be configured to send the data packets entirely in the background. In such a case, users of computer systems receiving data packets from the update system may not be notified in any way that the data packets are being received. Alternately, the update system may cause a window to be displayed on computers systems assigned to the group or subgroup to notify users of the computer systems when data packets are being received. An additional configuration options that may be available via group schedule and configuration option 1710 is a client debugging option. Turning on the client debugging option may cause a log file to be written on computer systems assigned to the group or subgroup when the updated system is sending data packets to them. The log file may be useful to assist a network administrator in identifying problems if one or more data packets are not installed correctly onto one or more computer systems by the update system.

Another option that may be available on group/subgroup pull down menu 1700 is a verification interval option 1712. Verification interval option 1712 may allow a user to set a frequency and/or time period during which computer systems assigned to the selected group or subgroup will be scanned. As used herein, "scanning" a computer system refers to determining configuration information regarding the computer system. For example, scanning may collect information such as, but not limited to: hardware configuration and/or software configuration. Hardware configuration may include information such as type of processor, hardware assets coupled to the computer system (e.g., mouse, keyboard and/or monitor type), memory available to the computer system, etc. Software configuration may include information such as name, version and/or version date of software applications on the computer system. Software configuration may also include information regarding data files (e.g., graphics files, text files, etc.) present on the computer system. Settings available via verification interval option 1712 may allow the user to specify that computer systems assigned to the group or subgroup should be scanned after the passing of a specified number of minutes, hours, days, etc. or when a user of a computer system logs in to the computer system.

In an embodiment, group/subgroup pull down menu 1700 may also give the user of the update system the option to initiate a scan of computer systems assigned to the group or subgroup immediately. For example, Run hotfix analyzer for group option 1714 may immediately initiate a scan of computer systems assigned to the group or subgroup using the HotFix utility available from Microsoft Corp. of Redmond, Wash.

As previously mentioned, a list of options similar to group/subgroup pull down menu 1700 may be available to the user by selecting an individual node rather than a group or subgroup. One difference between the options available for a node and the options available for a group or subgroup may be an option to review results of scanning a computer system. Scanning data is typically most useful on an individual computer basis. Therefore, a scan results option may only be available in a node pull down menu. However, in certain embodiments, a scanning program may be used that provides information at the group or subgroup level. In such cases, a review scan results option may be available at the group/subgroup level.

Also within the group manager view, a user may select an assigned data packet to view a pull down menu of options related to the selected data packet. For example, in an embodiment, options available in a data packet pull down menu may include a "force update now" option. A "force update now" option may immediately initiate sending one or more selected data packets to computer systems assigned to one or more groups or subgroups. The force update now option may be particularly useful for very high priority data packets such as security patches and/or virus definitions for virus protection software.

Figure 18:
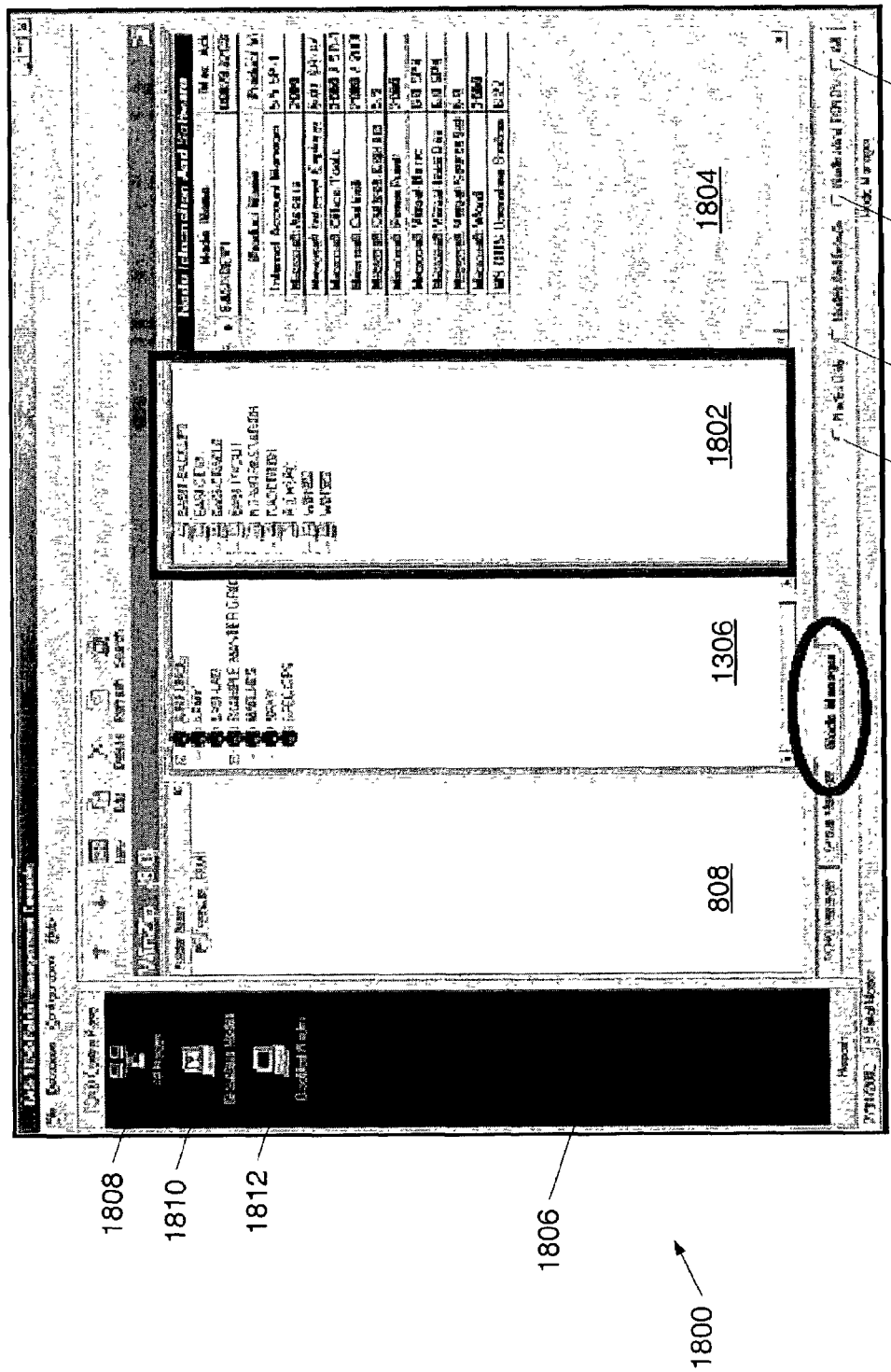
FIG. 18 depicts an embodiment of a node manager screen of an update system.

As previously mentioned, a node tab 1310 may allow a user to view information related to individual computer systems (i.e., nodes) coupled to a network. An embodiment of a node manager screen 1800 is depicted in FIG. 18. Node manager screen 1800 may be displayed in response to selection of node tab 1310.

Node manager screen 1800 may include a nodes window 1802 and a configuration window 1804, as well as one or more windows previously described (e.g., list window 808 and hierarchy window 1306). Nodes window 1802 may display a list of computer systems. The list of computer systems displayed may depend on one or more selections made in hierarchy window 1306. For example, if no group or subgroup is selected in hierarchy window 1306, then nodes window may display computer systems coupled to the network that are not assigned to any group or subgroup. However, if a group or subgroup is selected in hierarchy window 1306, then computer systems assigned to the selected group or subgroup may be displayed in nodes window 1802. Each node identified in nodes window 1802 may be associated with an icon. The icon displayed may depend on whether or not the associated node has been assigned to a group or subgroup. Thus, a first icon may indicate a node that is not assigned to any group or subgroup; whereas, a second icon may indicate that a node has been assigned to a group or subgroup.

Configuration window 1804 may display information related to the hardware and/or software configuration of a computer system selected in nodes window 1802. For example, configuration window 1804 may display configuration information including, but not limited to: hardware devices coupled to the computer system, operating system(s) present on the computer system and one or more data packets present on the computer system. Configuration information may be determined based on scanning one or more computer systems as previously described. In an embodiment, configuration window 1804 may selectively display configuration information based on a user defined configuration. For example, configuration window 1804 may only display known data packets, unknown (e.g., unrecognized) data packets, prohibited data packets, and/or allowed (e.g., not prohibited) data packets. In yet another embodiment, configuration window 1804 may display a desired and/or expected configuration of one or more computer systems. For example, a desired configuration may include information regarding data packets assigned to, but not yet installed on, a computer system. Similarly, an expected configuration may include information from a MCL regarding current or expected versions of various data packets.

Figure 19:
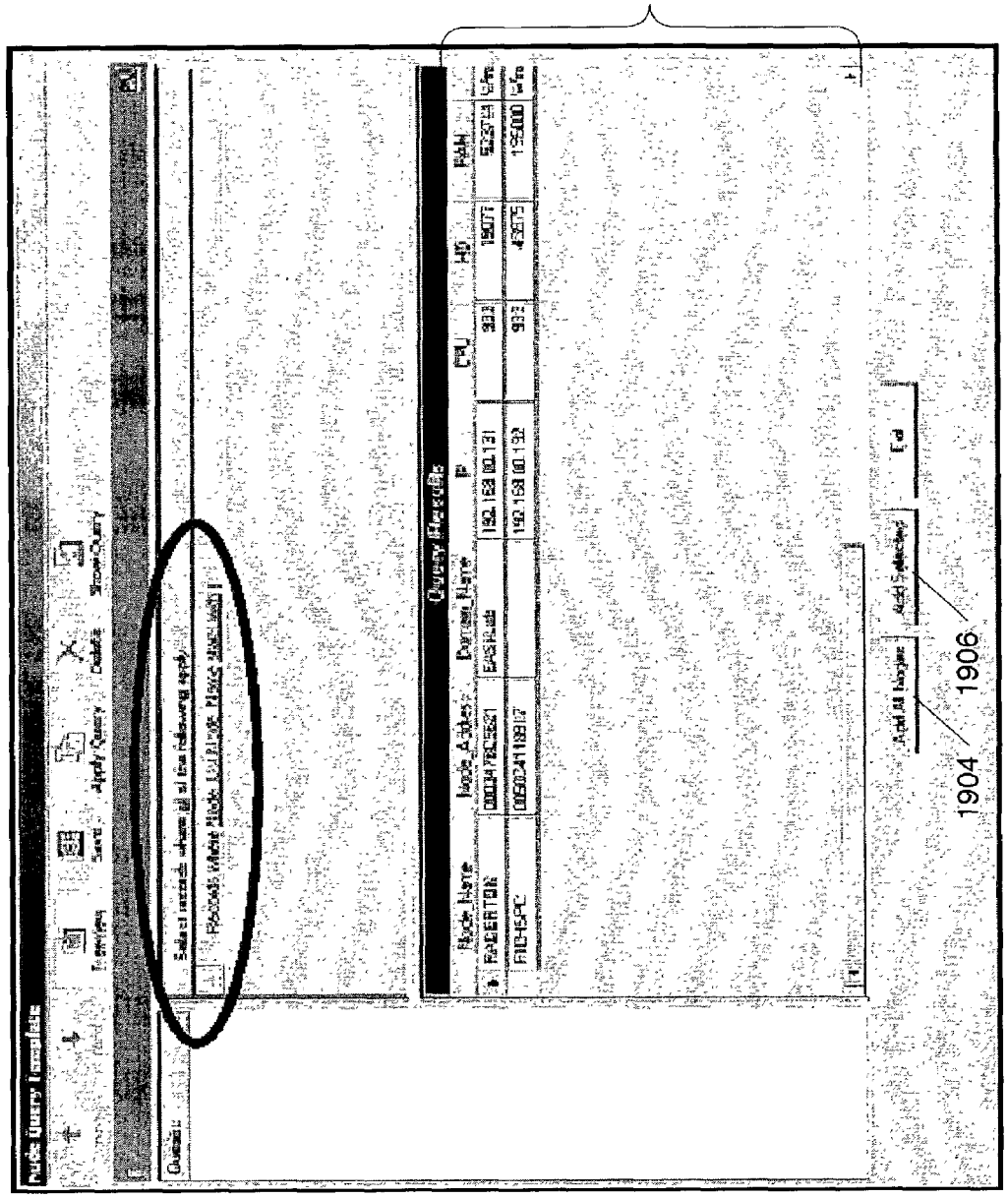
FIG. 19 depicts an embodiment of an add nodes screen of an update system.

In an embodiment, node manager screen 1800 may allow a user to assign one or more nodes to groups or subgroups. For example, one or more nodes may be selected. The selected node(s) may be assigned to groups/subgroups by dragging and dropping them. Alternately, a pull down menu may allow selected nodes to be assigned to groups/subgroups. In yet another example, a pull down menu associated with a group or subgroup may cause an add nodes screen 1900 to be displayed as depicted in FIG. 19.

In an embodiment, add nodes screen 1900 may allow the user to search for nodes meeting specified criteria. Results of the search may be displayed in a results window 1902. The user may then assign one or more computer systems identified in results window 1902 to the group or subgroup the user selected when the add nodes screen was opened. In an embodiment, the user may select an "add all" button 1904 to assign all of the computer systems identified in results window 1902 to the group or subgroup. Alternately, the user may select one or more computer systems in results window 1902 and select an "add selected" button 1906 to add only the selected computer systems to the group or subgroup.

In an embodiment, if a computer system that is already assigned to a group or subgroup is selected to be assigned to another group or subgroup, the user may be notified that the selected computer system is already assigned to a group or subgroup. The user may then be asked to confirm the assignment of the selected computer system to the selected group or subgroup. Similarly, in an embodiment, the user may be inhibited from deleting a non-empty group or subgroup. That is only groups or subgroups with no subgroups or nodes assigned may be deleted.

In an embodiment, node manager screen 1800, group manager screen 1300 and/or data packet management screen 800 may be used to assign a data packet to one or more computer systems or one or more groups of computer systems. For example, a data packet may be selected in list window 808 and dragged and dropped to a desired computer system in nodes window 1802 or to a desired group or subgroup in hierarchy window 1306. Data packets assigned to computer systems or groups of computer systems may be represented in nodes window 1802 and/or hierarchy window 906 to provide ready confirmation of data packets assigned to various computer systems and/or groups.

Figure 20:
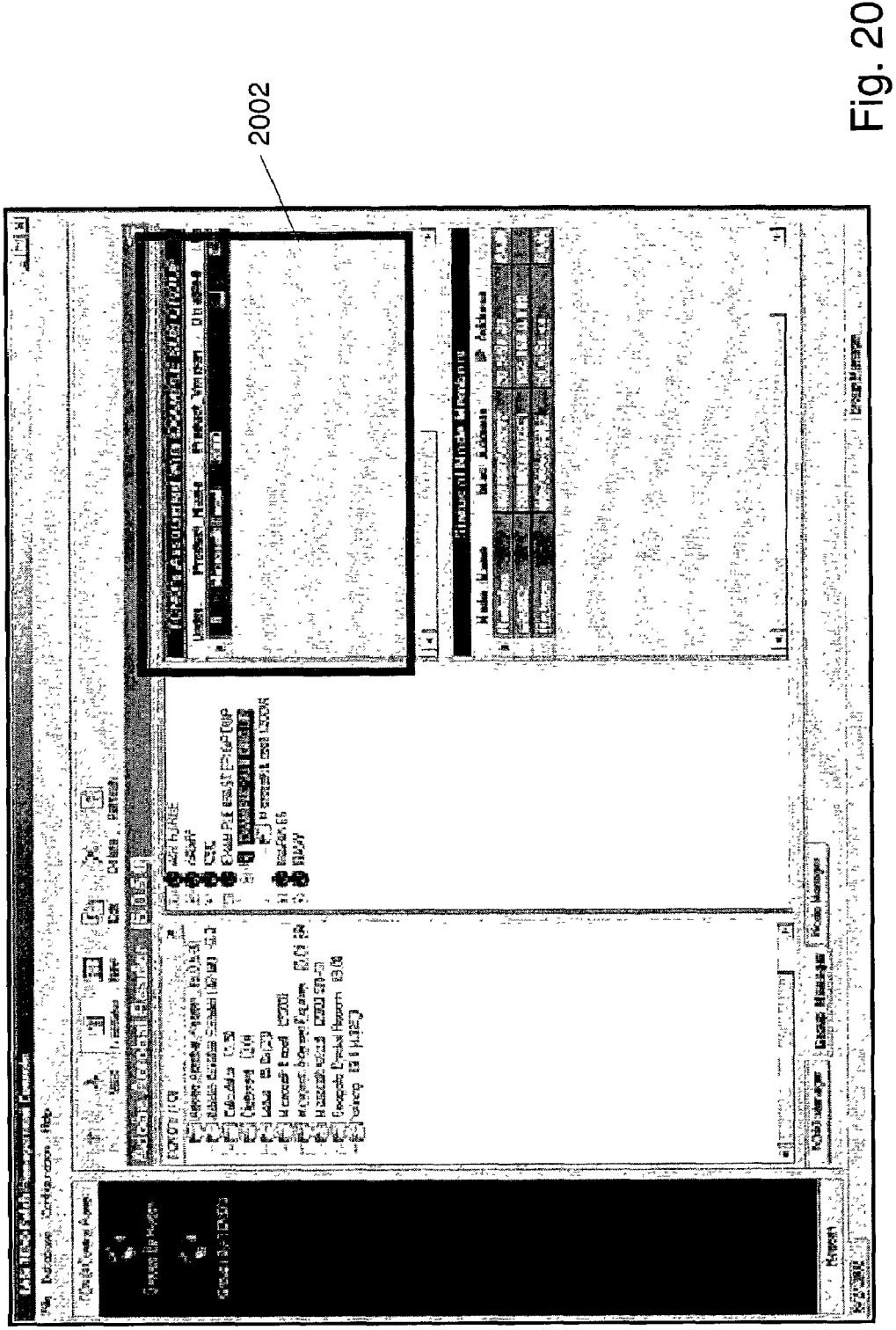
FIG. 20 depicts an embodiment of an assigned data packets window of an update system.

After assigning a data packet to at least one computer system an assigned data packets window 2002 may be added to the manager screen currently in use (e.g., node manager screen 1800, group manager screen 1300, or data packet manager screen 800). FIG. 20 depicts an embodiment of an assigned data packets window 2002. Assigned data packets window 2002 may display information related to one or more data packets assigned to a selected computer system, group or subgroup. For example, assigned data packets window 2002 may display data packet identification information as was discussed previously.

In an embodiment, node manager screen 1800 may include a view window 1806. View window 1806 may allow the user arrange data displayed in node manager screen 1800 in a desired manner. Selections available to the user in the node manager view window may include, but are not limited to: all nodes view 1808, groupless nodes view 1810, and disabled nodes view 1812. As the name implies, all nodes view 1808 may cause all nodes (i.e., computer systems) of the network to be listed regardless of the status of the node. Groupless nodes view 1810 may cause only nodes that are not assigned to any group or subgroup to be listed. Disabled nodes view 1812 may cause nodes that have been disabled to be listed.

Other view options may be available to the user in node manager screen 1800. For example, window selection buttons 1814, 1816, 1818 and 1820 at the bottom of node manager screen 1800 may enable the user to change the windows presented in node manager screen 1800. All windows selection 1820 may present all of the windows previous described in the node manager screen 1800 as depicted in FIG. 18. In an embodiment the all windows configuration may be the default way that node manager screen 1800 is displayed. Nodes only selection 1814 may limit the windows presented to nodes window 1802 and configuration window 1804. The nodes only view may allow more information about the nodes or a particular node to be displayed at one time. Nodes and groups selection 1816 may limit the windows presented to hierarchy window 1306, nodes window 1802 and configuration window 1804. Similarly, nodes and data packets selection 1818 may limit the windows displayed to list window 808, nodes window 1802 and configuration window 1804.

Figure 21A:
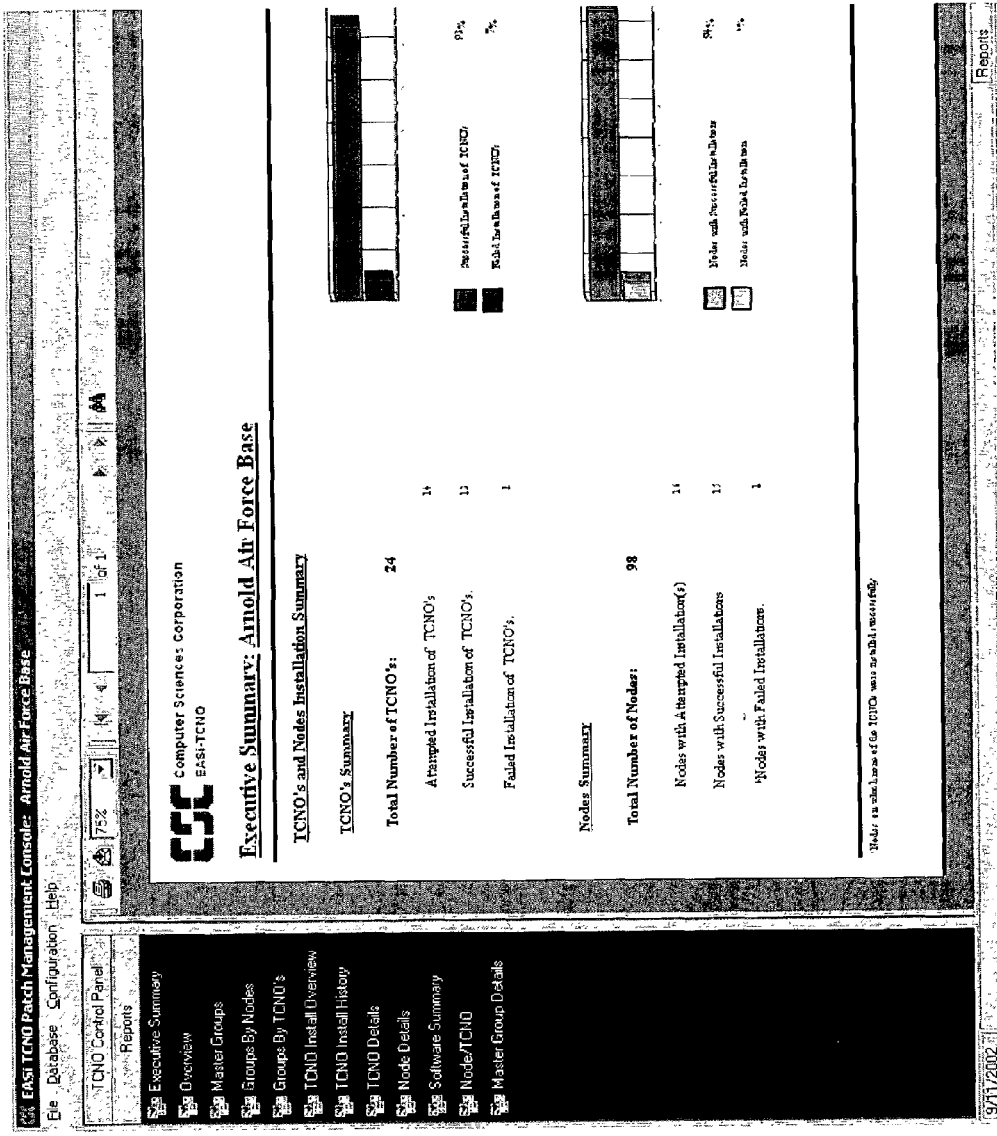
FIG. 21A depicts an example of an Executive Summary report.
Figure 21B:
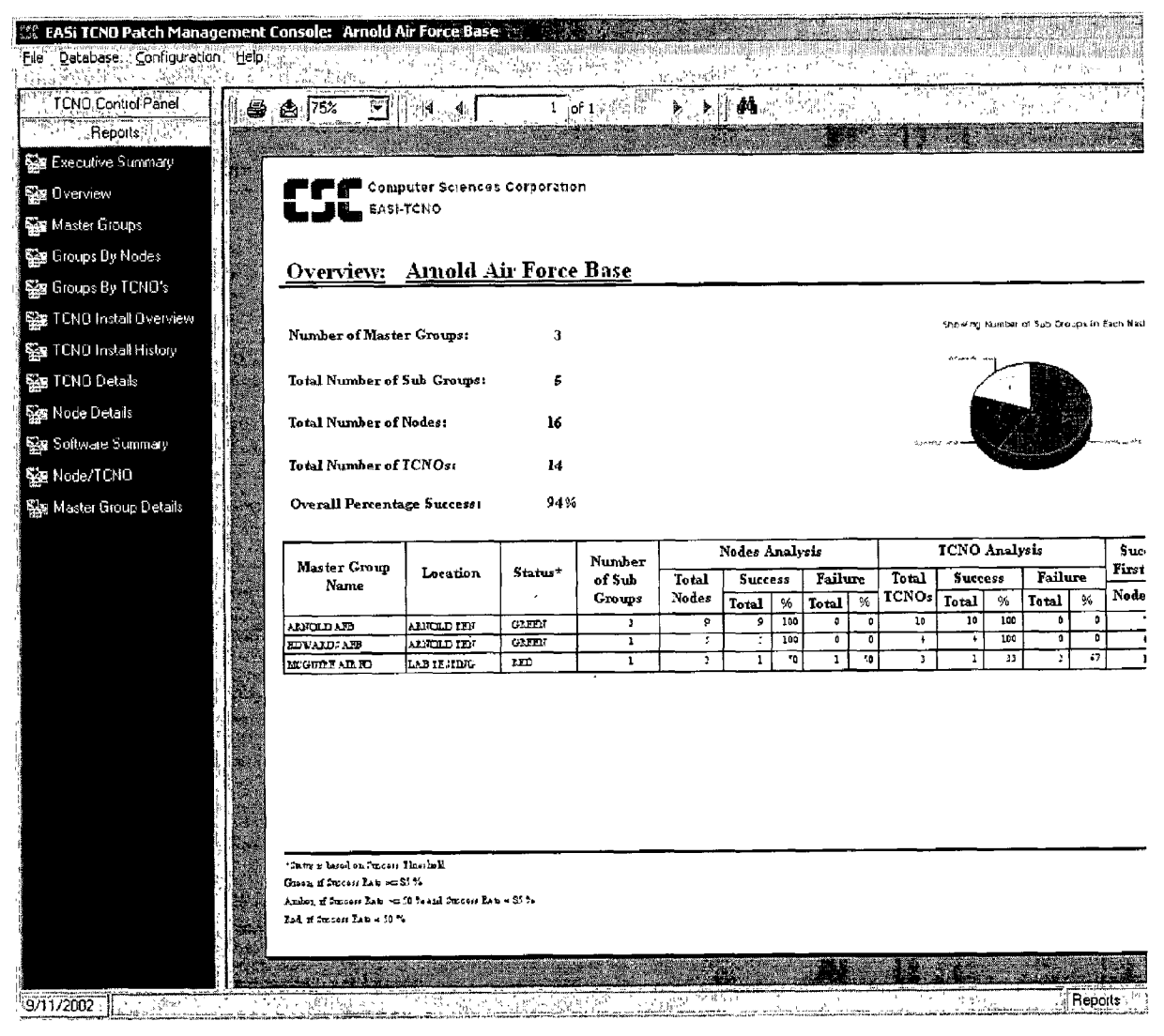
Figure 21C:
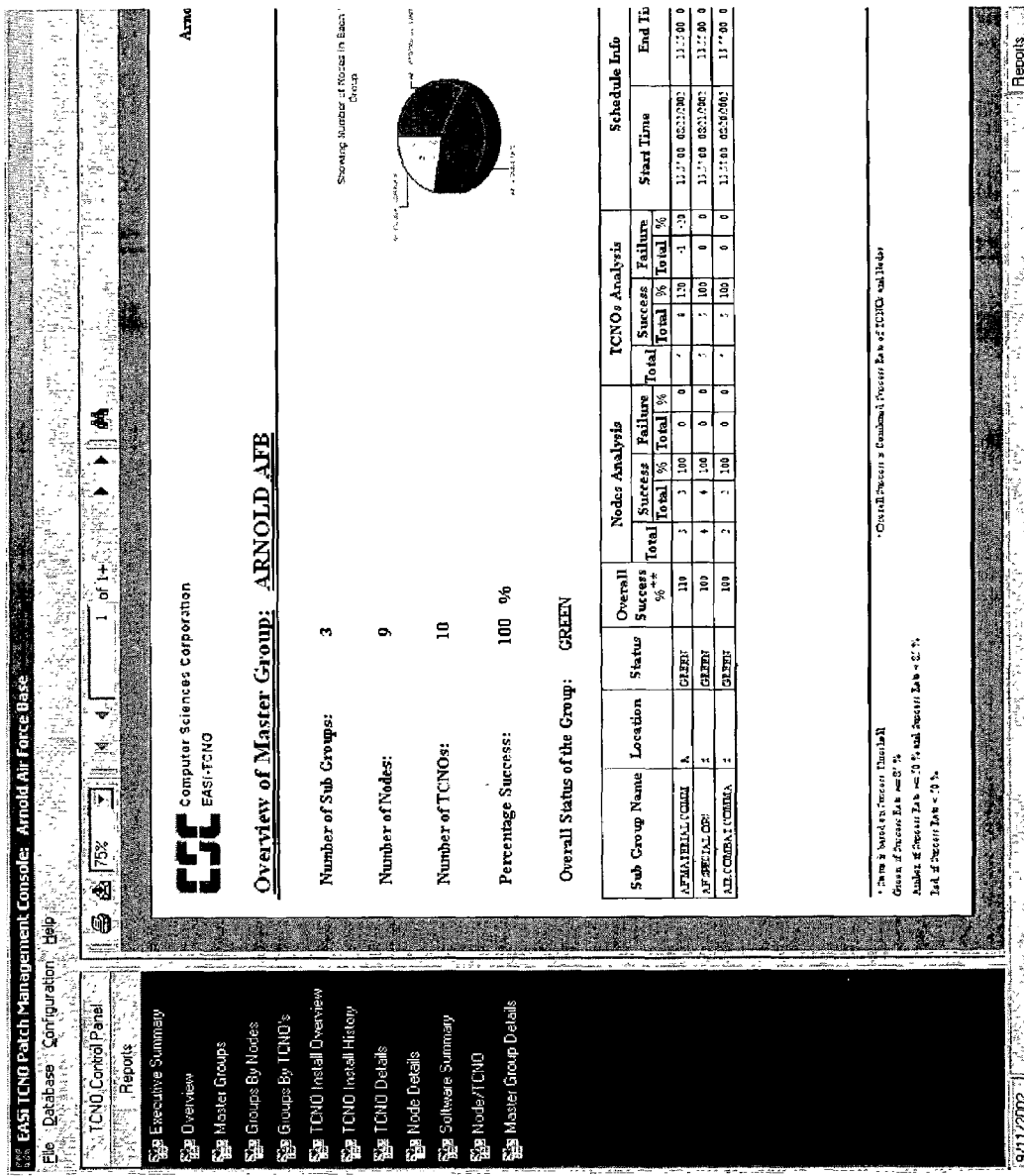
FIG. 21C depicts an example of an overview report of status and activities related to a group.
Figure 21D:
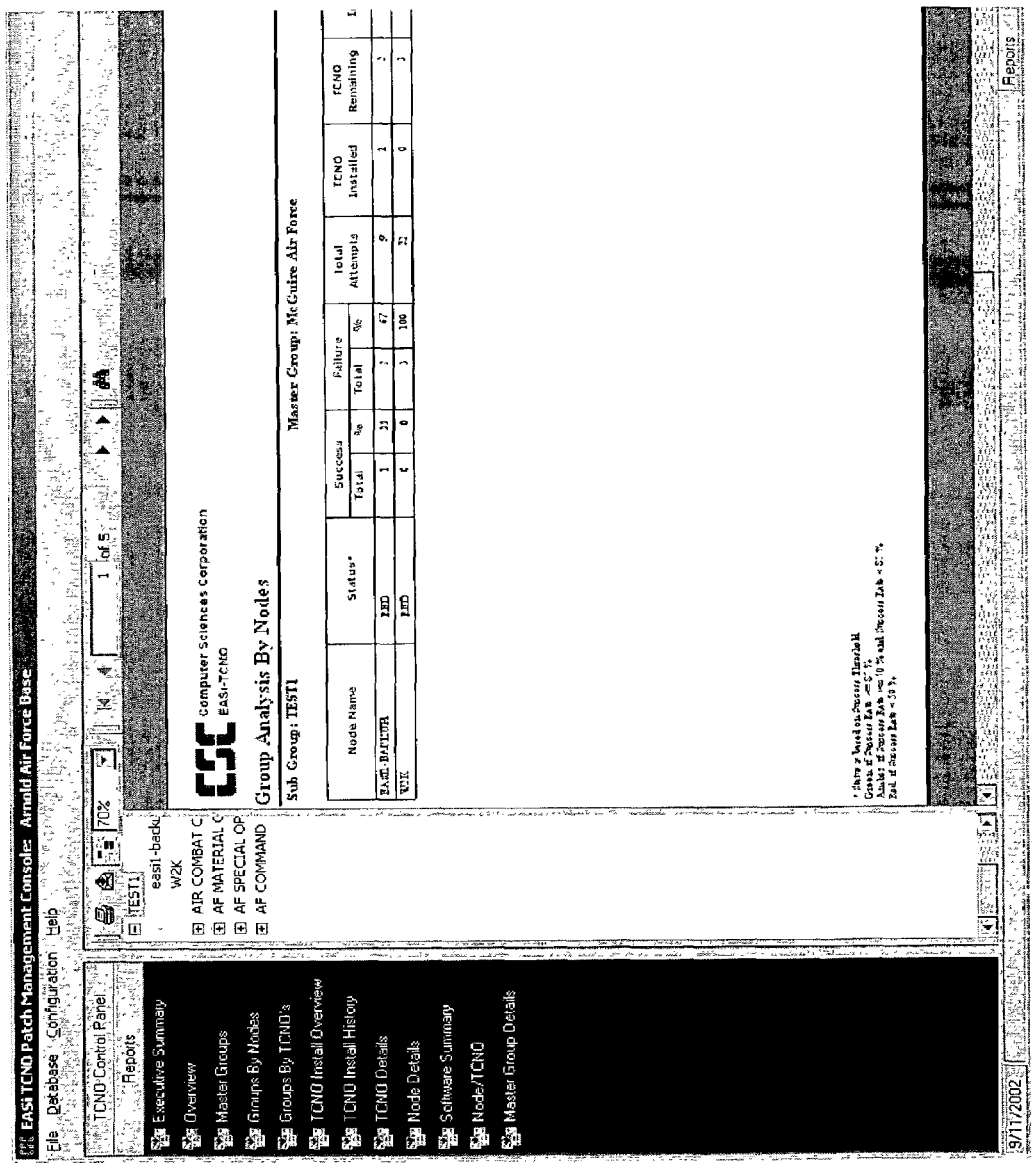
FIG. 21D depicts an example of a report of status and activities related to nodes in a group.
Figure 21E:
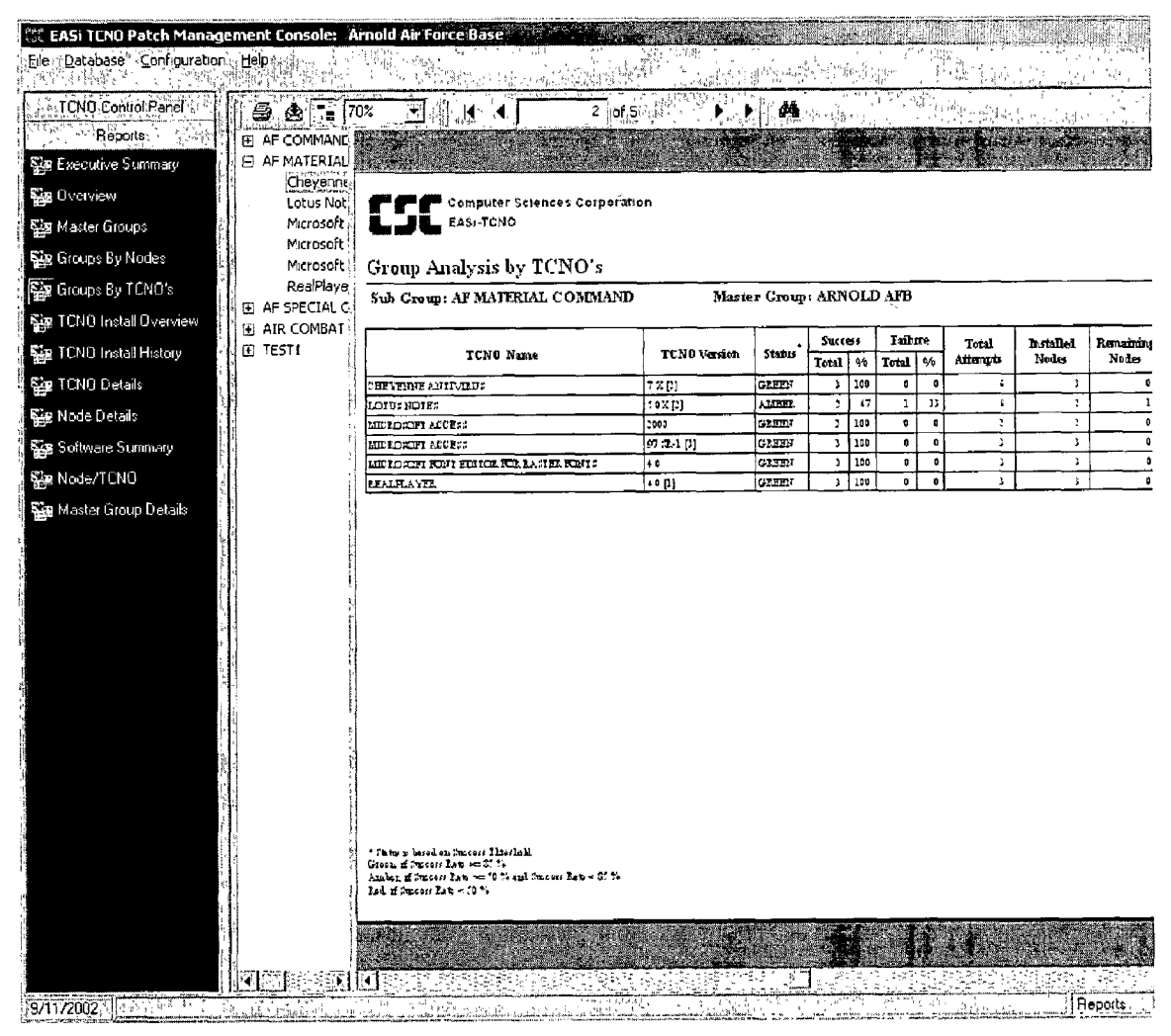
Figure 21F:
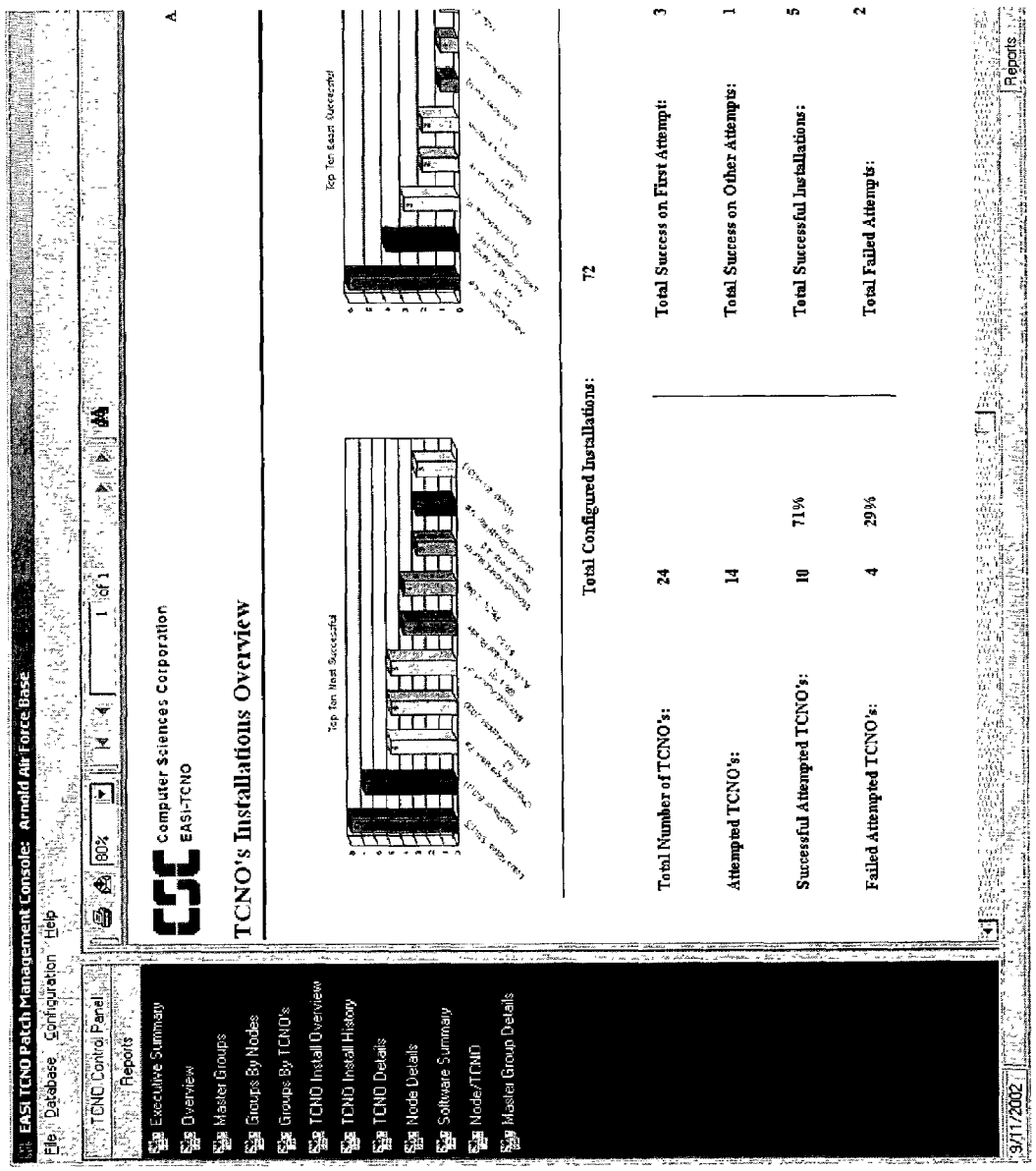
FIG. 21F depicts an example of an overview report of status and activities related to particular data packets.
Figure 21G:
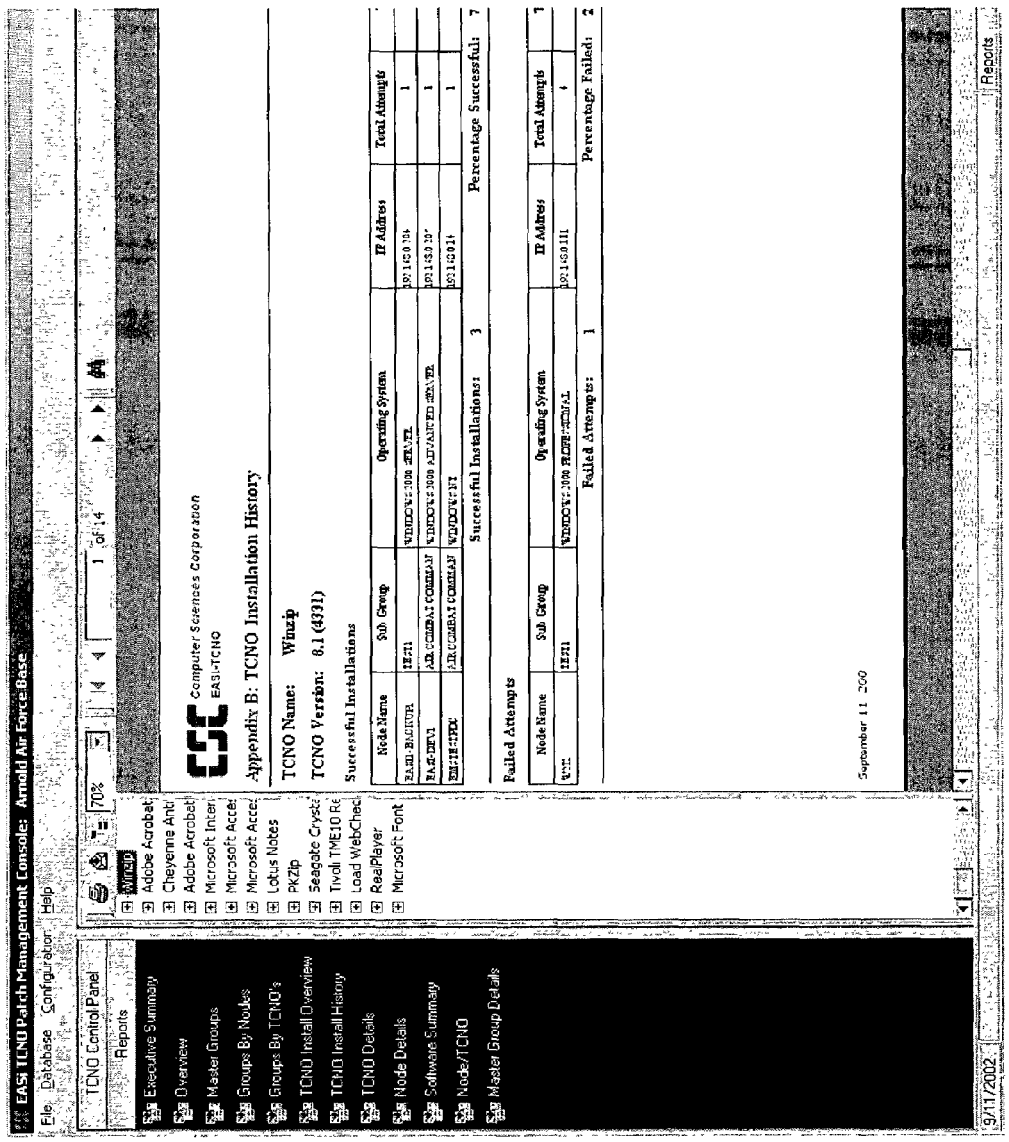
FIG. 21G depicts an example of a data packet installation history report.
Figure 21H:
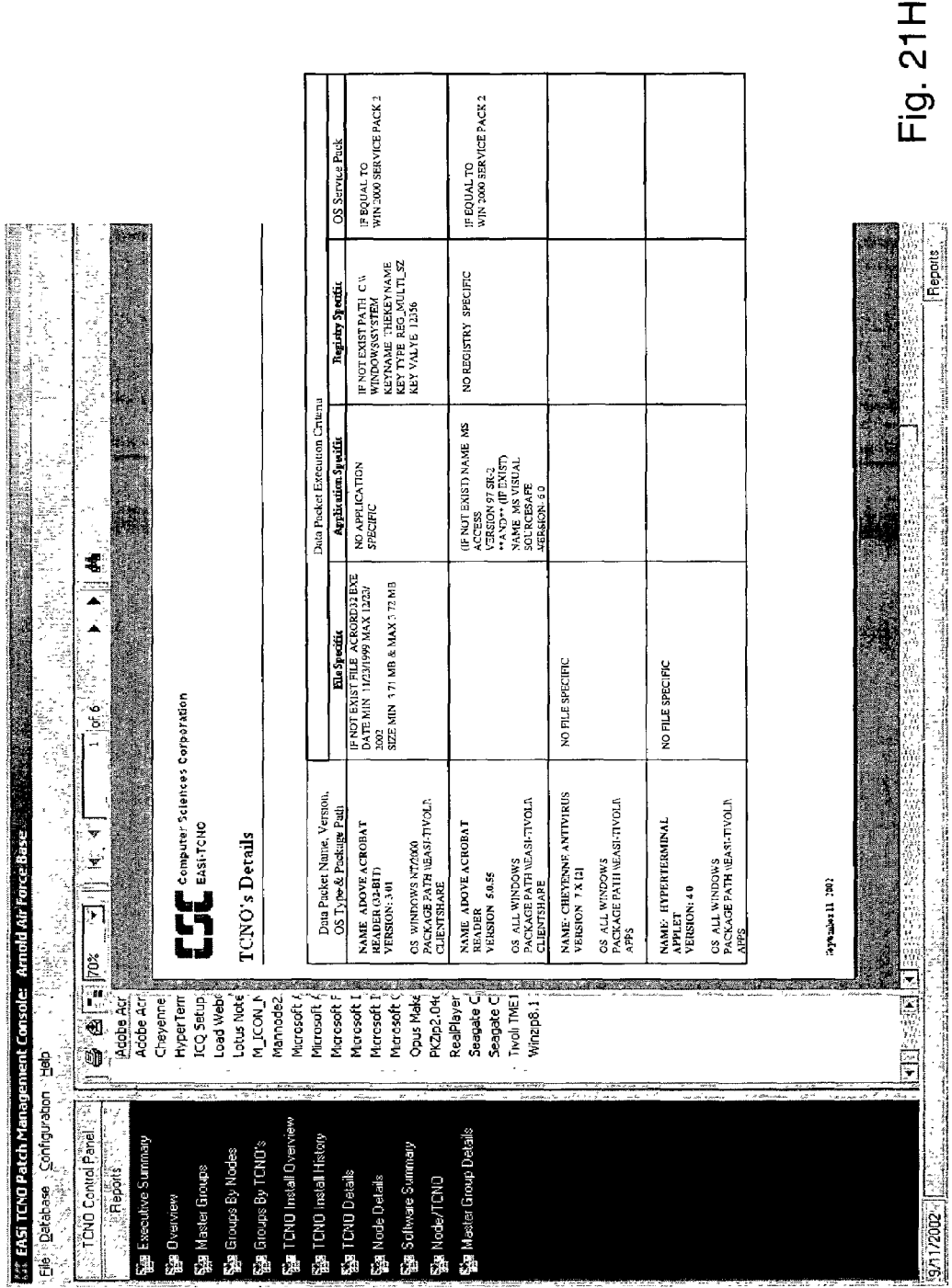
FIG. 21H depicts an example of a data packet detail report.
Figure 21I:
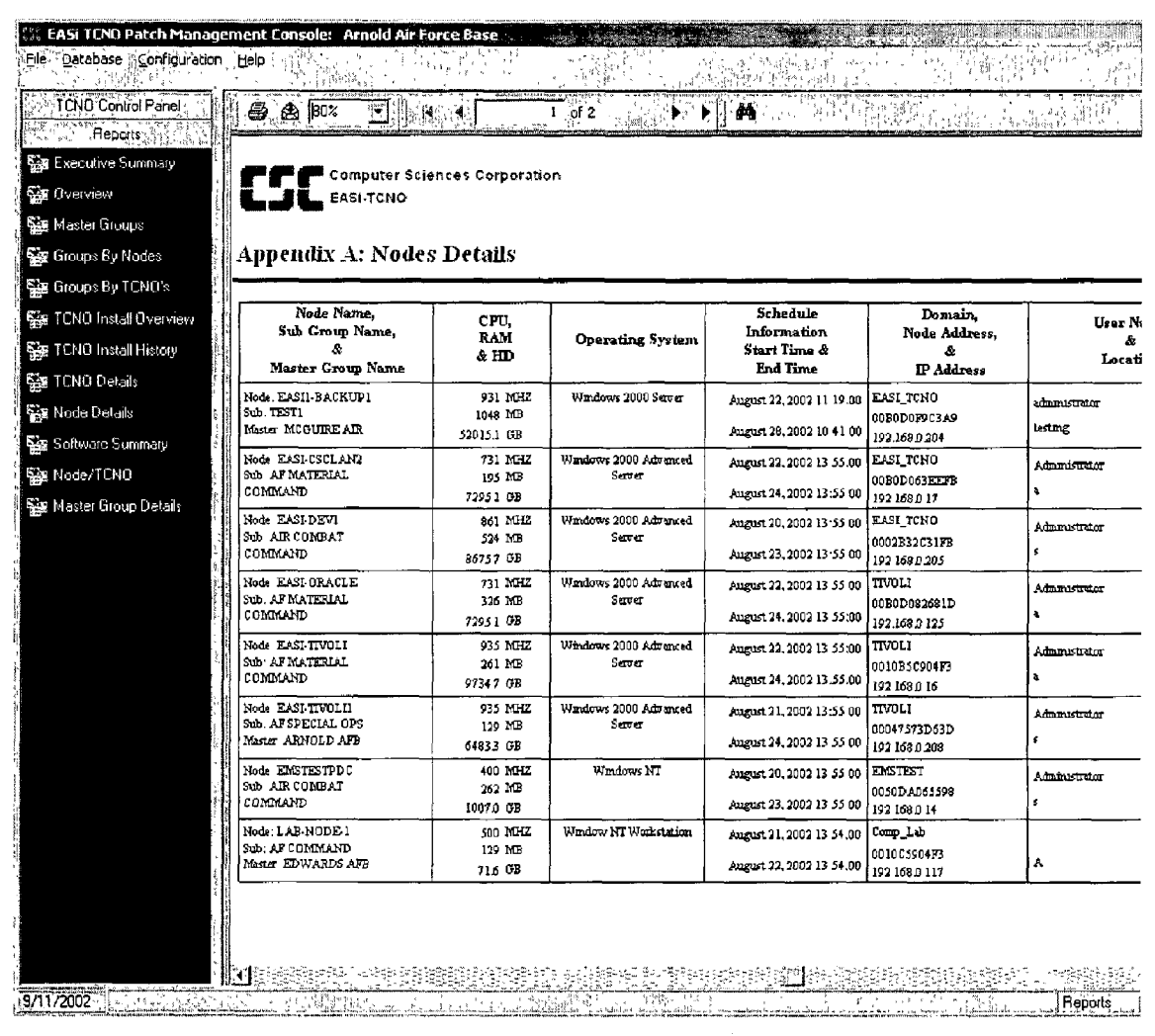
Figure 21K:
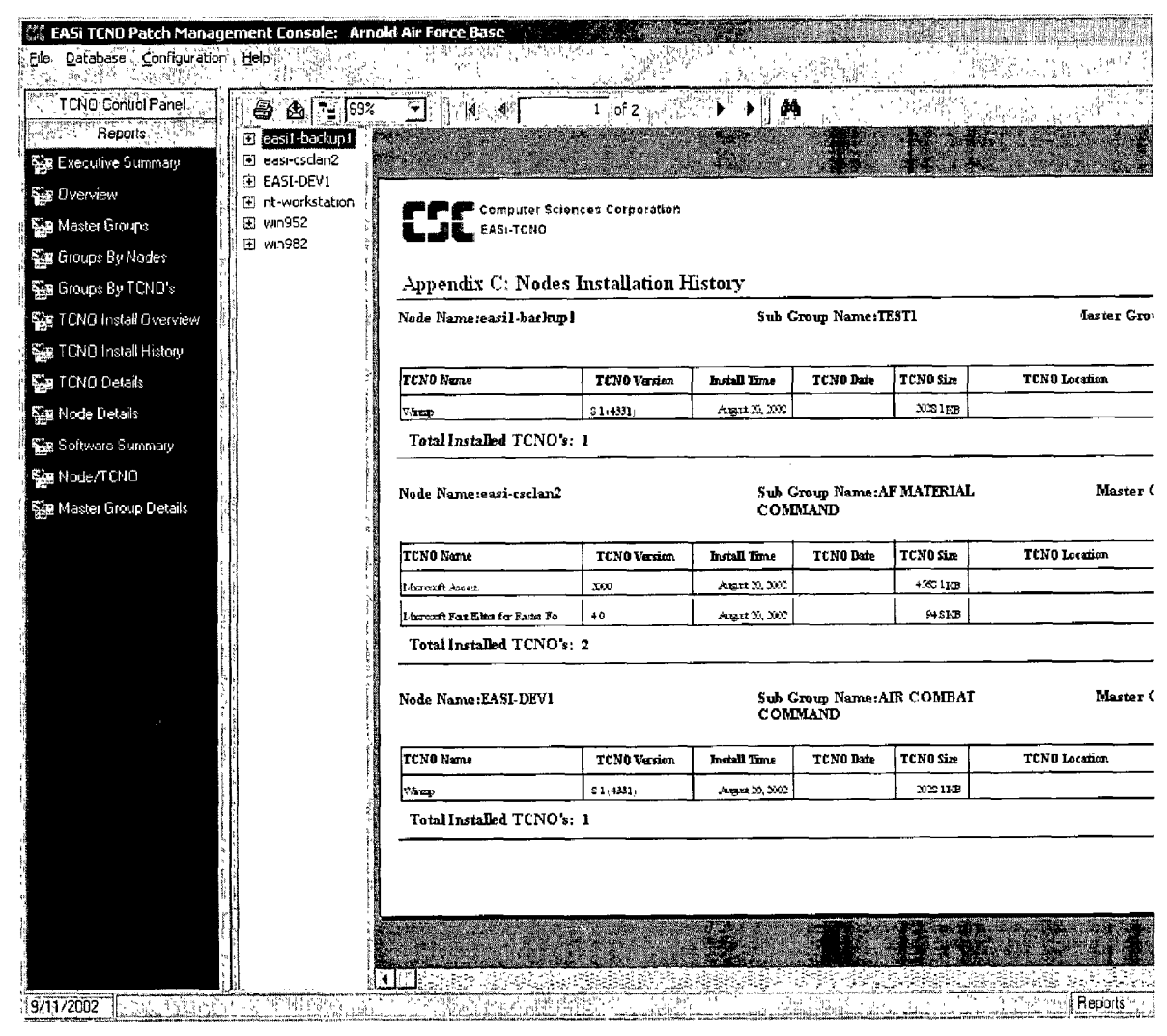
Figure 21L:
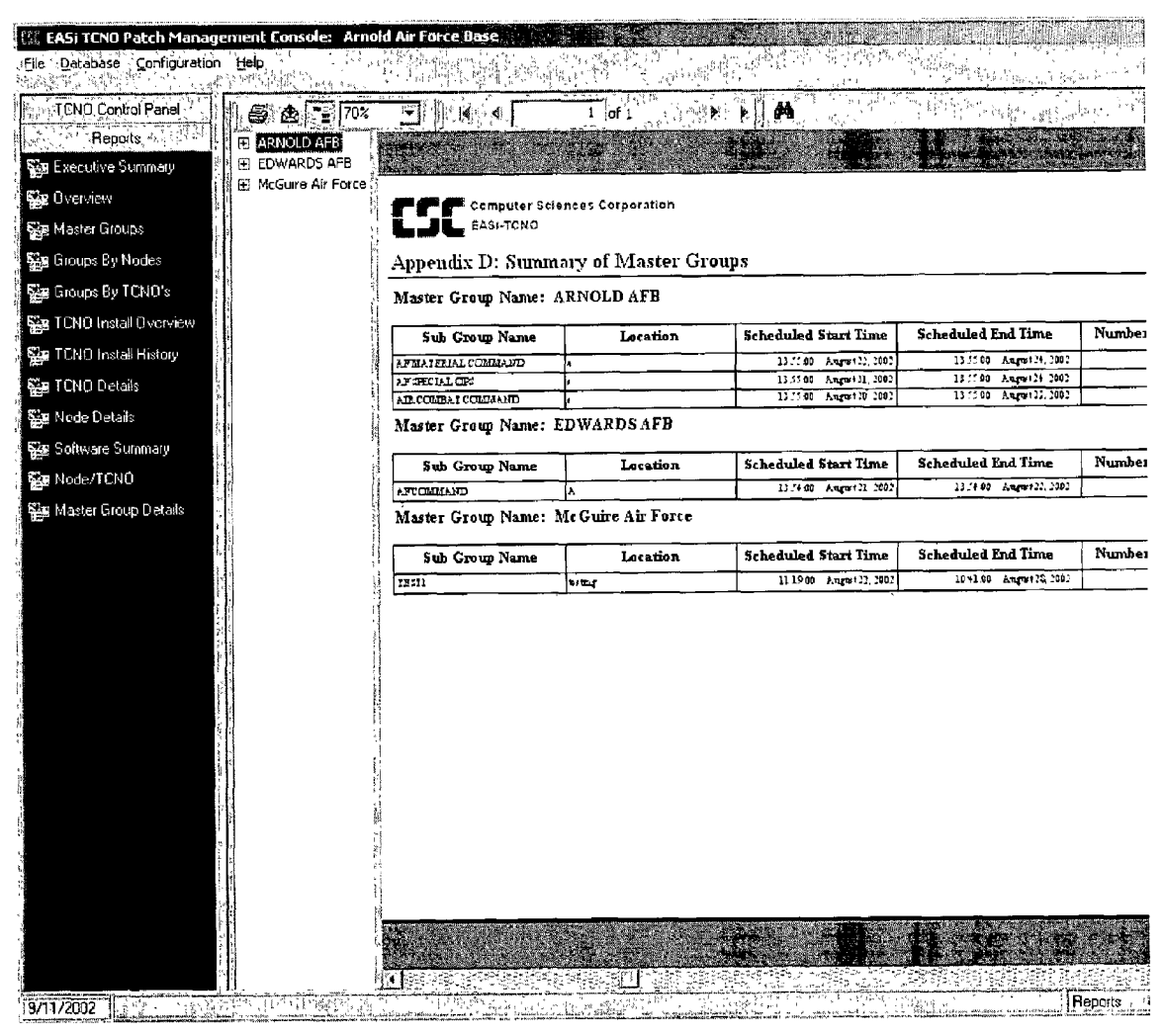

In an embodiment, an update system may provide one or more reports to the user regarding update system activities and/or status. Reports provided via the update system may include color coding of status information as previously described regarding FIGS. 7 and 14. Reports available via the update system may include reports such as those depicted in FIGS. 21A though 21L. FIG. 21A depicts an example of an Executive Summary report. FIG. 21B depicts an example of an overview report of status and activities for an entire network. FIG. 21C depicts an example of an overview report of status and activities related to a group. FIG. 21D depicts an example of a report of status and activities related to nodes in a group. FIG. 21E depicts an example of a report of status and activities related to data packets assigned to a group. FIG. 21F depicts an example of an overview report of status and activities related to particular data packets. FIG. 21G depicts an example of a data packet installation history report. FIG. 21H depicts an example of a data packet detail report. FIG. 21I depicts an example of a detailed report of status and activities related to one or more nodes. FIG. 21J depicts an example of a report summarizing software applications identified on a network. FIG. 21K depicts an example of a report listing installation history of the update system by node. FIG. 21L depicts an example of a report summarizing status and activities related to a number of groups.

Various embodiments further include receiving or storing instructions and/or data implemented in accordance with the description herein upon a carrier medium. Suitable carrier media include memory media or storage media such as magnetic or optical media, e.g., disk or CD-ROM, as well as transmission media or signals such as electrical, electromagnetic, or digital signals, conveyed via a communication medium such as networks and/or a wireless link.

Although the systems and methods of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method of providing data packets to a plurality of computer systems coupled to a network, comprising:

providing a network management system on a network, wherein the network management system comprises a network management system server and one or more agent programs on one or more computer systems, wherein an agent program is configured to receive commands from the network management system and to implement received commands on a computer system;

providing an update system on the network, wherein the update system is configured to issue commands to the network management system for execution on the network management system server or one or more computer systems;

sending one or more configuration commands from the update system to the network management system, wherein in response to one or more received configuration commands the network management system sends one or more scanning applications to one or more computer systems, wherein one or more scanning applications are configured to determine configuration information regarding one or more computer systems and to store the configuration information on a memory accessible via the network;

identifying one or more data packets with the update system;

associating one or more identified data packets with one or more computer systems based on the configuration information of the one or more computer systems;

generating one or more commands in the update system; and sending one or more generated commands from the update system to the network management system, wherein in response to one or more received commands the network management system installs one or more identified data packets on one or more computer systems associated with one or more identified data packets using the network management system server and one or more agent programs.

2. The method of claim 1, wherein the determined configuration information comprises hardware configuration information regarding one or more computer systems coupled to the network.

3. The method of claim 1, wherein the determined configuration information comprises software configuration information regarding one or more computer systems coupled to the network.

4. The method of claim 1, further comprising determining whether one or more data packets were installed properly by the network management system.

5. The method of claim 1, further comprising sending one or more verification commands from the update system to the network management system, wherein in response to one or more received verification commands the network management system determines whether one or more data packets were installed properly.

6. The method of claim 1, further comprising comparing the configuration information to a master control list.

7. The method of claim 6, wherein the master control list comprises a list of prohibited software.

8. The method of claim 6, wherein the master control list comprises identification of a current version of one or more software applications.

9. The method of claim 6, wherein the master control list comprises identification of one or more non-executable files.

10. The method of claim 1, wherein the scanning application does not persist on one or more computer systems after the configuration information has been stored.

11. The method of claim 1, further comprising storing a log file on one or more computer systems comprising a list of commands received by one or more computer systems from the update system via the network management system.

12. The method of claim 1, wherein no additional software needs to be installed on a client system in order to execute the update system.

13. The method of claim 1, wherein at least one data packet comprises a software patch.

14. The method of claim 1, wherein at least one data packet comprises a software application.

15. The method of claim 1, wherein at least one data packet comprises a non-executable file.

16. The method of claim 1, further comprising assigning one or more computer systems to one or more client groups.

17. The method of claim 1, further comprising generating one or more configuration rules, wherein a configuration rule comprises one or more conditions that must be met for the update system to send one or more commands to the network management system to install one or more data packets on one or more computer systems.

18. The method of claim 17, wherein one or more conditions comprises whether one or more files having specified parameters exist on one or more computer systems.

19. The method of claim 17, wherein one or more conditions comprises whether one or more software applications having specified parameters exist on one or more computer systems.

20. The method of claim 17, wherein one or more conditions comprises whether a registry file of one or more computer systems meets specified parameters.

21. The method of claim 17, wherein one or more conditions comprises whether an operating system of one or more computer systems meets specified parameters.

22. The method of claim 17, wherein one or more conditions comprises whether a specified time has elapsed.

23. A system, comprising:
a network management system server, configured to implement a network management system on a network;
a plurality of computer systems coupled to the network;
at least one agent programs on at least one computer system couple to the network;
wherein at least one agent program is configured to receive commands from the network management system and to implement received commands on at least one computer system; and
an update system in communication with the network management system, wherein the update system is configured to issue commands to the network management system for execution on the network management system server or one or more computer systems via one or more agent programs;
wherein the update system is further configured to send one or more configuration commands from the update system to the network management system, wherein in response to one or more received configuration commands the network management system sends one or more scanning applications to one or more computer systems, wherein one or more scanning applications are configured to determine configuration information regarding one or more computer systems and to store the configuration information on a memory accessible via the network; and
wherein the update system is further configured to receive information identifying one or more data packets to be installed on at least one computer system coupled to the network, and to receive input assigning one or more identified data packets with one or more computer systems; and
wherein the update system is further configured to send one or more generated commands from the update system to the network management system, wherein in response to one or more received commands the network management system installs one or more identified data packets on one or more computer systems associated with one or more identified data packets using the network management system server and one or more agent programs.

24. A computer storage medium comprising program instructions, wherein the program instructions are executable on a computer system to implement a method comprising:
providing a network management system on a network, wherein the network management system comprises a network management system server and one or more agent programs on one or more computer systems, wherein an agent program is configured to receive commands from the network management system and to implement received commands on a computer system;
providing an update system on the network, wherein the update system is configured to issue commands to the network management system for execution on the network management system server or one or more computer systems;

sending one or more configuration commands from the update system to the network management system, wherein in response to one or more received configuration commands the network management system sends one or more scanning applications to one or more computer systems, wherein one or more scanning applications are configured to determine configuration information regarding one or more computer systems and to store the configuration information on a memory accessible via the network; identifying one or more data packets with the update system; associating one or more identified data packets with one or more computer systems based on the configuration information of the one or more computer systems;

generating one or more commands in the update system; and sending one or more generated commands from the update system to the network management system, wherein in response to one or more received commands the network management system installs one or more identified data packets on one or more computer systems associated with one or more identified data packets using the network management system server and one or more agent programs.

* * * * *